(12) United States Patent
Tsuda et al.

(10) Patent No.: US 11,395,964 B2
(45) Date of Patent: Jul. 26, 2022

(54) INFORMATION PROCESSING APPARATUS, INFORMATION PROCESSING SYSTEM, STORAGE MEDIUM AND INFORMATION PROCESSING METHOD

(71) Applicant: NINTENDO CO., LTD., Kyoto (JP)

(72) Inventors: Munetaka Tsuda, Kyoto (JP); Fumihiko Tamiya, Kyoto (JP); Shunta Sano, Kyoto (JP); Mizuho Nakazawa, Kyoto (JP)

(73) Assignee: NINTENDO CO., LTD., Kyoto (JP)

( * ) Notice: Subject to any disclaimer, the term of this patent is extended or adjusted under 35 U.S.C. 154(b) by 305 days.

(21) Appl. No.: 16/171,587

(22) Filed: Oct. 26, 2018

(65) Prior Publication Data

US 2019/0275423 A1 Sep. 12, 2019

(30) Foreign Application Priority Data

Mar. 8, 2018 (JP) .............................. JP2018-041951

(51) Int. Cl.
*A63F 13/42* (2014.01)
*G06F 3/038* (2013.01)
(Continued)

(52) U.S. Cl.
CPC .............. *A63F 13/42* (2014.09); *A63F 13/79* (2014.09); *G06F 3/0338* (2013.01); *G06F 3/0383* (2013.01)

(58) Field of Classification Search
CPC ........ G06F 3/0418; G06F 3/033; G06F 17/30; A63F 13/42; F06F 19/00
See application file for complete search history.

(56) References Cited

U.S. PATENT DOCUMENTS 5,748,512 A * 5/1998 Vargas .................. G06F 3/0237
 345/173
8,294,667 B2 * 10/2012 Longe ................... G06F 40/232
 345/156

(Continued)

FOREIGN PATENT DOCUMENTS

JP 2012-529123 11/2012
JP 2013-168001 8/2013
(Continued)

OTHER PUBLICATIONS

Notice of Reasons for Refusal dated Feb. 22, 2022 in Japanese Application No. 2018-041951 and English-language translation.
(Continued)

*Primary Examiner* — Cao H Nguyen
(74) *Attorney, Agent, or Firm* — Nixon & Vanderhye, P.C.

(57) ABSTRACT

A non-limiting example game system that functions as a non-limiting example information processing system includes a game apparatus, and an input device and a television are connected to this game apparatus. When inputting a personal identification number (Pin) in an input screen displayed on the television using an analog stick in a state not showing input contents, sizes of input areas that are set corresponding to respective directions of the analog stick are changed according to whether a numeral of a correct answer is an odd number or an even number. When the numeral of the correct answer is an odd number, the input areas to which the odd numbers are assigned are made large, and when the numeral of the correct answer is an even number, the input areas to which the even numbers are assigned are made large.

19 Claims, 18 Drawing Sheets

DESIGNATING INPUT AREA OF "1"  DESIGNATING TARGET CHANGEABLE AREA WITHIN INPUT AREA OF "2"

(51) Int. Cl.
*A63F 13/79* (2014.01)
*G06F 3/0338* (2013.01)

(56) References Cited

U.S. PATENT DOCUMENTS

| | | | | |
|---|---|---|---|---|
| 8,375,334 B2* | 2/2013 | Nakano | ............... | G06F 1/1626 |
| | | | | 715/810 |
| 8,780,043 B2* | 7/2014 | Yoshioka | ............... | A63F 13/06 |
| | | | | 345/161 |
| 8,917,286 B2* | 12/2014 | Ohba | ............... | G06T 3/40 |
| | | | | 345/619 |
| 9,044,672 B2* | 6/2015 | Fujii | ............... | A63F 13/2145 |
| 9,606,668 B2* | 3/2017 | Hotelling | ............... | G06F 3/0418 |
| 10,695,661 B2 | 6/2020 | Otani et al. | | |
| 2018/0353857 A1* | 12/2018 | Ito | ............... | A63F 13/5255 |
| 2018/0353875 A1* | 12/2018 | Sa Gomes | ............... | C08G 65/30 |

FOREIGN PATENT DOCUMENTS

| | | |
|---|---|---|
| JP | 2015-061180 | 3/2015 |
| JP | 2015-167758 | 9/2015 |
| WO | 2010/141678 | 12/2010 |

OTHER PUBLICATIONS

English-language machine translation of JP 2015-061180 (published Mar. 30, 2015).
English-language machine translation of JP 2013-168001 (published Aug. 29, 2013).
[Online], Nintendo Mimamori Switch, https://www.nintendo.co.jp/support/switch/parentalcontrols/setting_change.html w/ English Translation, 2017, 5 pages.

* cited by examiner

NORMAL CORRECTION MODE

ODD NUMBER CORRECTION MODE

EVEN NUMBER CORRECTION MODE

45-DEGREE MODE

DESIGNATING INPUT AREA OF "1"

DESIGNATING TARGET CHANGEABLE AREA WITHIN INPUT AREA OF "2"

DESIGNATING INPUT AREA OF "1"

DESIGNATING TARGET NON-CHANGEABLE AREA WITHIN INPUT AREA OF "2"

DESIGNATING INPUT AREA OF "1"

DESIGNATING TARGET NO-CHANGEABLE AREA WITHIN INPUT AREA OF "2"

DESIGNATING INPUT AREA OF "1"

DESIGNATING INPUT AREA OF "3"

INFORMATION PROCESSING APPARATUS, INFORMATION PROCESSING SYSTEM, STORAGE MEDIUM AND INFORMATION PROCESSING METHOD

CROSS REFERENCE OF RELATED APPLICATION

The disclosure of Japanese Patent Application No. 2018-41951 filed on Mar. 8, 2018 is incorporated herein by reference.

FIELD

This application describes an information processing apparatus, information processing system, storage medium and information processing method, in which an input is performed using an analog stick.

SUMMARY

It is a primary object of an embodiment(s) to provide a novel information processing apparatus, information processing system, storage medium and information processing method.

Moreover, it is another object of the embodiment(s) to provide an information processing apparatus, information processing system, storage medium and information processing method, capable of making it difficult for an input content to be grasped from a screen.

Furthermore, it is a still another object of the embodiment(s) to provide an information processing apparatus, information processing system, storage medium and information processing method, capable of reducing an erroneous input in a manner not displaying the input content on the screen.

A first embodiment is an information processing apparatus, comprising: a display portion; an operation portion; an area determination portion; a decision portion; and an area change portion. The display portion is configured to display a plurality of input targets. A plurality of input areas respectively corresponding to the plurality of input targets are set to the operation portion. The area determination portion is configured to determine one (1) input area designated by the operation portion among the plurality of input areas. The decision portion is configured to decide an input target corresponding to the one input area that is determined by the area determination portion. Then, the area change portion is configured to enlarge an input area corresponding to the input target that should be currently input. Furthermore, the display portion is configured to display the plurality of input targets in a manner that an input target corresponding to the input area that is designated by the operation portion cannot be identified.

According to the first embodiment, since a plurality of input targets are displayed in a manner that an input target corresponding to the designated input area cannot be identified, it is possible to make it difficult for the input content to be grasped from a screen. Moreover, since the input area corresponding to the input target that should be currently input is enlarged, it is possible to make it easier for the input area to be designated. Therefore, it is possible to reduce an erroneous input in a manner that the input content is not displayed on the screen.

A second embodiment is the information processing apparatus according to the first embodiment, wherein the area change portion is configured to reduce at least one of the input areas corresponding to a further input target that is not the input target that should be currently input.

According to the second embodiment, since the input area corresponding to the further input target that should not to currently be input is reduced, it is possible to make it difficult for this further input area to be designated. Therefore, it is possible to prevent an erroneous input.

A third embodiment is the information processing apparatus according to the first embodiment, wherein the area change portion is configured to enlarge some input areas corresponding to some input targets including the input target that should be currently in.

According to the third embodiment, since some input areas corresponding to some input targets including the input target that should be currently input are enlarged, in comparison with a case where only the input area corresponding to the input target that should be currently input, it is possible to make hard for the input target that should be input to be easily grasped by a third person.

A fourth embodiment is the information processing apparatus according to the third embodiment, wherein respective one of the some input areas is set in a state of being adjacent to either of other input areas, and the some input areas that are enlarged by the area change portion includes a first input area that is the input area corresponding to the input target that should be currently input and a second input area that is the input area that is not adjacent to the first input area.

According to the fourth embodiment, it is possible to make it easy for the input area corresponding to the input target that should be input to be input, and it is possible to make it hard for the input target that should be input to be easily grasped.

A fifth embodiment is the information processing apparatus according to the fourth embodiment, wherein the area change portion is configured to reduce the input area adjacent to the first input area.

According to the fifth embodiment, since the input area adjacent to the input area corresponding to the input target that should be currently input is reduced, it is possible to reduce an erroneous input effectively.

A sixth embodiment is the information processing apparatus according to the fourth embodiment, wherein the area change portion is configured to reduce the input area adjacent to both the first input area and the second input area.

According to the sixth embodiment, it is possible to reduce an erroneous input effectively, and it is possible to make it hard for the input target that in a correct answer to be easily grasped.

A seventh embodiment is the information processing apparatus according to the first embodiment, wherein the plurality of input areas are set to be arranged in a ring-like form.

According to the seventh embodiment, since the plurality of input areas are arranged in a ring-like form, it is possible to perform an input only by designating either direction.

An eighth embodiment is the information processing apparatus according to the seventh embodiment, wherein the operation portion includes a direction input portion capable of inputting in a vertical direction, a horizontal direction and a diagonal direction, and the input areas are respectively set in the vertical direction, the horizontal direction and the diagonal direction.

According to the eighth embodiment, since only the vertical direction, the horizontal direction or the diagonal direction may be designated, it is possible to perform an input easily.

A ninth embodiment is the information processing apparatus according to the eighth embodiment, wherein the area change portion is configured to enlarge, when the first input area that is the input area corresponding to the input target should be currently input is set in the vertical direction, all the input areas that are set in the vertical direction, to enlarge, when the first input area is set in the horizontal direction, all the input areas that are set in the horizontal direction, and to enlarge, when the first input area is set in the diagonal direction, all the input areas that are set in the diagonal direction.

According to the ninth embodiment, it is possible to make it easy for an input area corresponding to the input target that should be input to be input, and it is possible to make it hard for the input target that should be input to be easily grasped.

A tenth embodiment is the information processing apparatus according to the eighth embodiment, wherein the area change portion is configured to enlarge, when the first input area that is the input area corresponding to the input target should be currently input is set in the vertical direction or the horizontal direction, all the input areas that are set in the vertical direction and the horizontal direction, and to enlarge, when the first input area is set in the diagonal direction, all the input areas that are set in the diagonal direction.

According to the tenth embodiment, similar to the ninth embodiment, it is possible to make it easy for the input area corresponding to the input target that should be input to be performed, and it is possible to make it hard for the input target that should be input to be easily grasped.

An eleventh embodiment is the information processing apparatus according to the eighth embodiment, wherein the input area that is set in the diagonal direction is made larger than the input areas that are set in the vertical direction and the horizontal direction, respectively in an initial state.

According to the eleventh embodiment, since it is difficult to input to the input areas in the diagonal direction, by making the input areas of the diagonal direction larger in advance, it becomes easy to input to the input areas also in the diagonal direction.

A twelfth embodiment is the information processing apparatus according to the first embodiment, further comprising: a continuation determination portion configured to determine, when the input area designated by the operation portion is changed to a further input area, whether the further input area after change is being designated more than a predetermined time period; and an area determination change portion configured to change the input area that is determined by the area determination portion to the further input area when it is determined, by the continuation determination portion, that the further input area after change is being designated more than the predetermined time period.

According to the twelfth embodiment, similar to the ninth embodiment, it is possible to make it easy for the input area corresponding to the input target that should be input to be input, and it is possible to make it hard for the input target that should be input to be easily grasped. Moreover, since it is determined whether the further input area is being designated more than the predetermined time period, it is possible to reduce an erroneous input due to shaking hand.

A thirteenth embodiment is the information processing apparatus according to the twelfth embodiment, further comprising: a number of times detection portion configured to detect a number of times that the input area designated by the operation portion is changed to a further input area; and a number of times determination portion configured to determine whether the number of times detected by the number of times detection portion is equal to or more than a predetermined number of times, wherein the area determination change portion immediately changes, irrespective of a determination result of the continuation determination portion, the input area to the further input area when it is determined, by the number of times determination portion, that the number of times detected by the number of times detection portion is equal to or more than the predetermined number of times.

According to the thirteenth embodiment, since it is determined that an operation of rotating is performed when the number of times is equal to or more than the predetermined number, and in this case, since the input area is immediately changed to the further input area when the input area to be designated is changed, it is possible to prevent an input from being delayed.

A fourteenth embodiment is the information processing apparatus according to the thirteenth embodiment, wherein the area change portion is configured to equalize sizes of the plurality of input areas when it is determined, by the number of times determination portion, that the number of times is equal to or more than the predetermined number.

According to the fourteenth embodiment, since the sizes of the plurality of input areas are equalized when the operation of rotating is performed, it is possible to prevent the input target that should be input from being known by an operation of the third person.

A fifteenth embodiment is the information processing apparatus according to the first embodiment, further comprising a notification portion configured to notify, by vibration, that either input area is designated by the operation portion.

According to the fifteenth embodiment, even if the input target is displayed in a manner that the input target cannot be identified, it is possible to know by vibration that the input area is designated.

A sixteenth embodiment is the information processing apparatus according to the fifteenth embodiment, wherein the notification portion is configured to notify by vibration that the input area that is being designated by the operation portion is changed to a further input area.

According to the sixteenth embodiment, even if the input target is displayed in a manner that the input target cannot be identified, it is possible to know by vibration that the designated input area is changed.

A seventeenth embodiment is the information processing apparatus according to the first embodiment, further comprising a selection portion configured to select either a first mode that the input target corresponding the input area that is being designated by the operation portion cannot be identified or a second mode that the input target corresponding the input area that is being designated by the operation portion can be identified, wherein the area change portion is configured to enlarge the input area corresponding to the input target that should be currently input when the first mode is selected by the selection portion.

According to the seventeenth embodiment, since the input area corresponding to the input target that should be currently input is enlarged when the first mode not capable of identifying the input target is selected, it is possible to reduce an erroneous input even if the input target cannot be identified.

An eighteenth embodiment is an information processing system, comprising: a display portion; an operation portion; an area determination portion; a decision portion; and an area change portion. The display portion is configured to display a plurality of input targets. A plurality of input areas respectively corresponding to the plurality of input targets are set to the operation portion. The area determination portion is configured to determine one (1) input area designated by the operation portion among the plurality of input areas. The decision portion is configured to decide an input target corresponding to the one input area that is determined by the area determination portion. Then, the area change portion is configured to enlarge an input area corresponding to the input target that should be currently input. Furthermore, the display portion is configured to display the plurality of input targets in a manner that an input target corresponding to the input area that is designated by the operation portion cannot be identified.

A nineteenth embodiment is a non-transitory computer-readable storage medium storing an information processing program that is executable by a computer comprising an operation portion that a plurality of input areas respectively corresponding to a plurality of input targets are set, wherein the information processing program is configured to cause one or more processors of the computer to perform steps of: a display step configured to display the plurality of input targets; an area determination step configured to determine one (1) input area designated by the operation portion among the plurality of input areas; a decision step configured to decide an input target corresponding to the one input area that is determined by the area determination portion; and an area change step configured to enlarge an input area corresponding to the input target that should be currently input. Furthermore, the display step is configured to display the plurality of input targets in a manner that an input target corresponding to an input area that is designated by the operation portion cannot be identified.

A twentieth embodiment is an information processing method executed by a computer comprising an operation portion that a plurality of input areas respectively corresponding to a plurality of input targets are set, comprising steps of: (a) display step configured to display the plurality of input targets; (b) area determination step configured to determine one (1) input area designated by the operation portion among the plurality of input areas; (c) decision step configured to decide an input target corresponding to the one input area that is determined by the step (b); and (d) area change step configured to enlarge an input area corresponding to the input target that should be currently input. Furthermore, the step (a) is configured to display the plurality of input targets in a manner that an input target corresponding to an input area that is designated by the operation portion cannot be identified.

According to each of the eighteenth to the twentieth embodiments, similar to the first embodiment, it is possible to make hard for an input content to be grasped from a screen. Moreover, it is possible to reduce an erroneous input even in a manner not displaying the input content on the screen.

The above described objects and other objects, features, aspects and advantages of the embodiment(s) will become more apparent from the following detailed description when taken in conjunction with the accompanying drawings.

DETAILED DESCRIPTION OF NON-LIMITING EXAMPLE EMBODIMENTS

Figure 1:
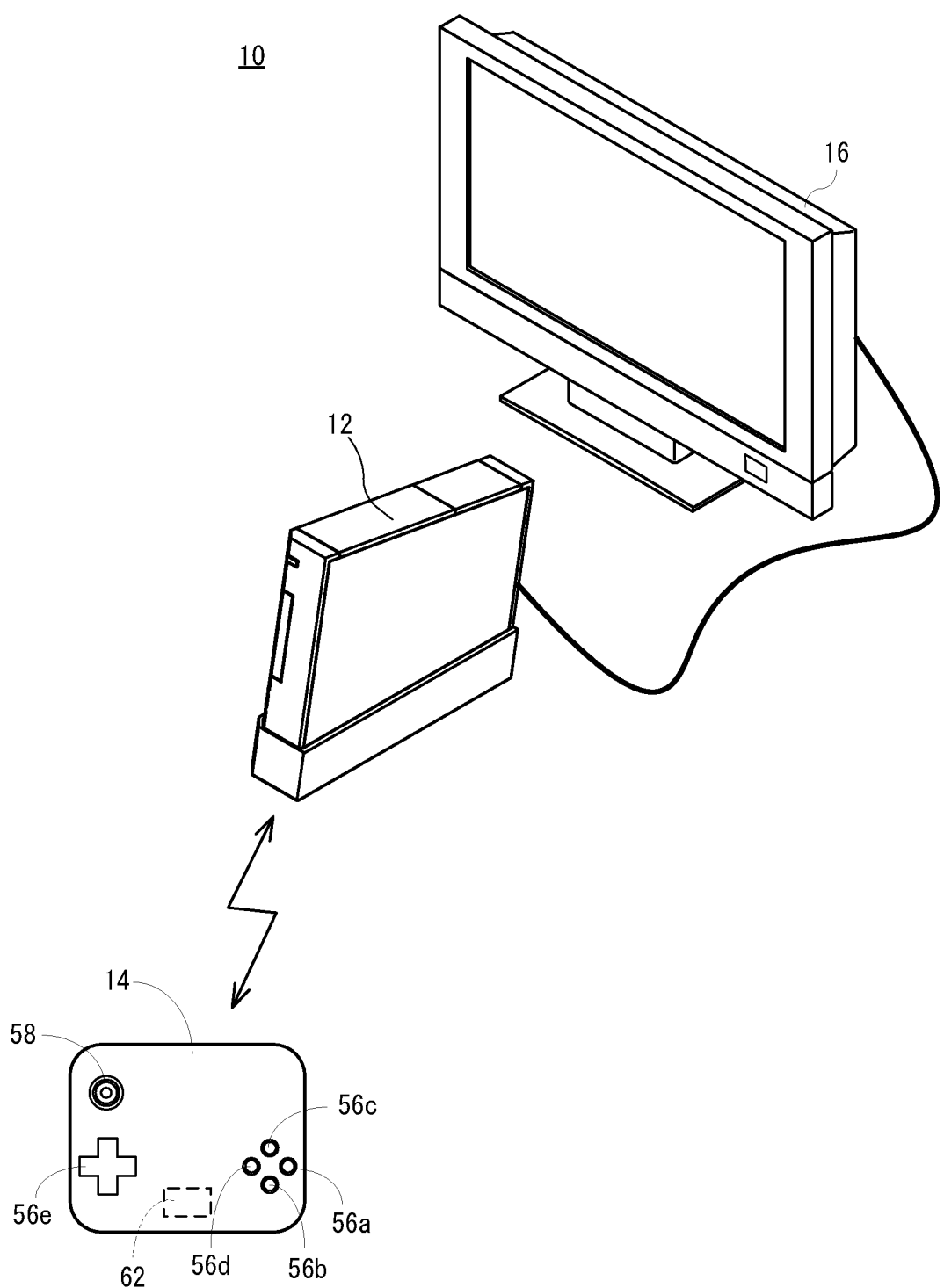
FIG. 1 is an appearance view of a non-limiting example game system.

In the following, with reference to drawings, a non-limiting example game system 10 according to an embodiment will be described. The game system 10 is a non-limiting example information processing system. As shown in FIG. 1, the game system 10 includes a stationary game apparatus 12 and a portable input device 14. Moreover, the game system 10 includes a stationary display device 16 typified by a television receiver or the like (hereinafter referred to as "television"), and the game apparatus 12 and the television 16 are connected to each other via a connection cable. This game system 10 performs game processing in the game apparatus 12 based on a game operation using the input device 14, and displays a game image obtained by the game processing on the television 16 and/or the input device 14.

The television 16 displays the game image obtained by the game processing performed in the game apparatus 12. The television 16 has a speaker and the speaker outputs a game sound obtained as a result of the above-described game processing. In addition, in other embodiments, the game apparatus 12 and the stationary display device may be integrated with each other. Moreover, communication between the game apparatus 12 and the television 16 may be wireless communication.

The input device 14 transmits or receives at least data to or from the game apparatus 12. It is possible for a user or player to use the input device 14 by moving the input device 14 in hands or by arranging the input device 14 in free positions. The input device 14 comprises an input portion such as an A button 56a, a B button 56b, an X button 56c, a Y button 56d, a cross button 56e and an analog stick 58, and a perception or notification portion such as a vibration motor 62. For example, the input device 14 can perform communication with the game apparatus 12 by wireless communication using Bluetooth (registered trademark) technology. The input device 14 receives vibration data generated by the game apparatus 12 from the game apparatus 12, and vibrates the vibration motor 62 based on the received vibration data. Moreover, the input device 14 transmits operation data representing a content of an operation performed on the own device to the game apparatus 12.

Figure 2:
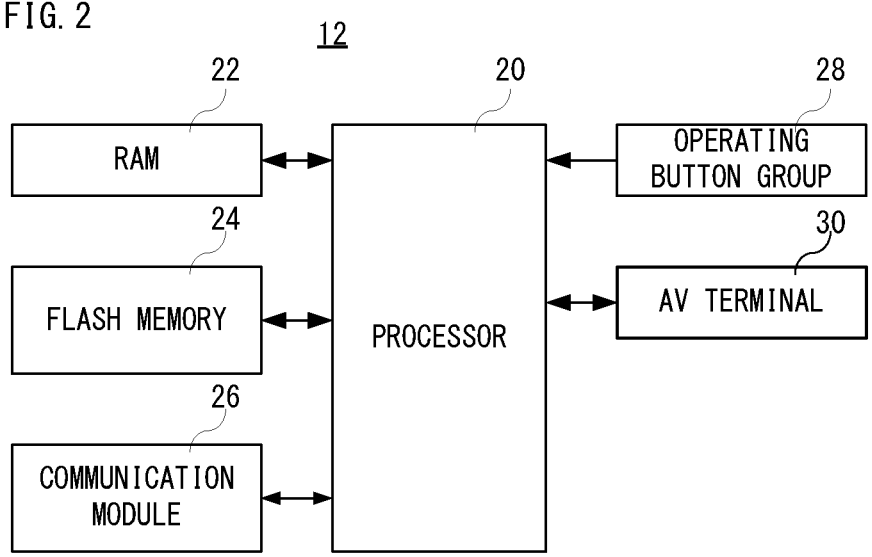
FIG. 2 is a block diagram showing non-limiting example electric structure of a non-limiting example game apparatus shown in FIG. 1.

FIG. 2 is a block diagram showing non-limiting example electric structure of the game apparatus 12 shown in FIG. 1. As shown in FIG. 2, the game apparatus 12 includes a processor 20, and the processor 20 is connected with a RAM 22, a flash memory 24, a communication module 26, an operation button group 28 and an AV terminal 30.

The processor 20 is in charge of overall control of the game apparatus 12. Specifically, the processor 20 is an SoC (System-on-a-Chip) incorporating functions of a CPU and a GPU. The RAM 22 is a volatile storage medium and used as a working memory and a buffer memory for the processor 20. The flash memory 34 is nonvolatile storage medium, and used in order to store an application program such as a game, and to store various kinds of data. For example, an application program, i.e., an information processing program is read from the flash memory 24 to be stored in the RAM 22. The game apparatus 12 performs processing of the application such as game processing, i.e., information processing by executing the information processing program stored in the RAM 22. That is, the game apparatus 12 functions as an information processing apparatus.

In addition, an application program may be stored in the RAM 22 by reading from an external memory that is attachable to or detachable from the game apparatus 12, such as an SD card, a memory stick or an optical disk. Moreover, an application program may be stored in the RAM 22 by downloading from an external computer that is communicably connected to the game apparatus 12. However, a part of an application program may be stored in the flash memory 24, and another part thereof may be acquired from an optical disk or an external computer. As to these matters, either one method or two or more methods are adopted.

However, there is no necessity that an application is limited to an application of game, and it is possible to perform various kinds of applications such as an application for a function equipped in the game apparatus 12 (hereinafter, referred to as "main body function"), a document creation application, an email application, a drawing application, a character practice application, a language training application, a learning application, etc.

The communication module 26 performs wireless communication with the input device 14. As described above, in this embodiment, a communication system according to Bluetooth (registered trademark) standard is adopted. However, an arbitrary system can be adopted as a communication method between the game apparatus 12 and the input device 14.

The operation button group 28 includes a power button, a reset button, etc. The AV terminal 30 is a terminal for connecting with the television 16 using a connection cable such as an HDMI (registered trademark) cable.

In addition, the electric structure of the game apparatus 12 shown in FIG. 2 is a mere example, and it does not need to be limited to this. In other embodiments, the input device 14 may be connected to the game apparatus 12 with a cable.

Figure 3:
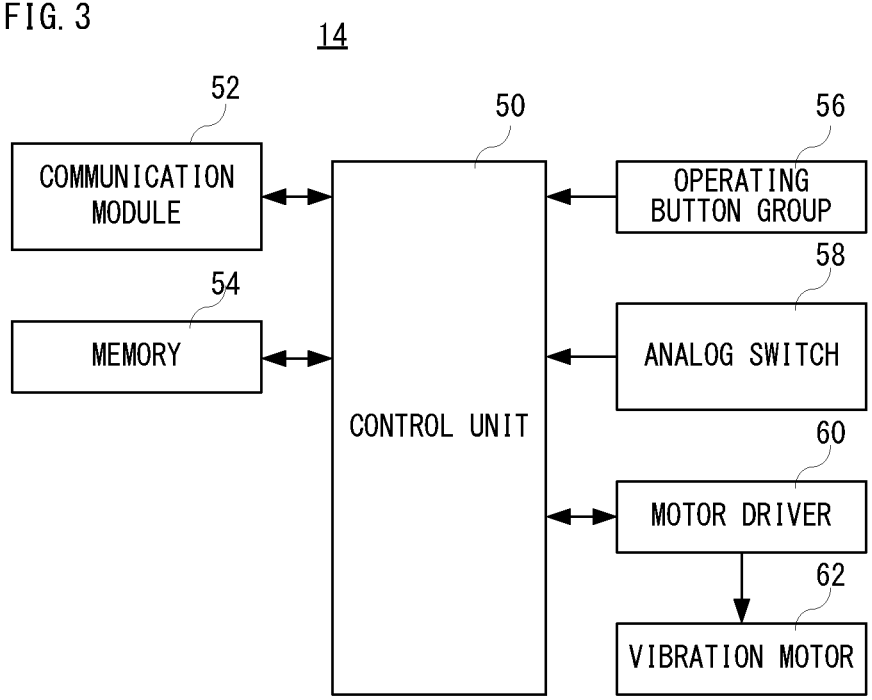
FIG. 3 is a block diagram showing non-limiting example electric structure of a non-limiting example input device shown in FIG. 1.

As shown in FIG. 3, the input device 14 includes a control unit 50, and the control unit 50 is connected with a communication module 52, a memory 54, an operation button group 56, an analog stick 58 and a motor driver 60. Moreover, the motor driver 60 is connected to a vibration moto 62.

The control unit 50 includes a microcomputer, for example, and is in charge of overall control of the input device 14. The communication module 52 is provided for communicably connecting with the game apparatus 12. As described above, since a wireless communication system according to Bluetooth (registered trademark) system is adopted for the communication module 26 provided in the game apparatus 12, a wireless communication system according to Bluetooth (registered trademark) standard is also adopted as for the communication module 52. Therefore, the input device 14 transmits operation data to the game apparatus 12 according to the above-mentioned wireless communication system from the communication module 52. Moreover, the control unit 50 receives and acquires the vibration data from the game apparatus 12 with the communication module 52.

The memory 54 is a nonvolatile storage device such as a flash memory, and stores a firmware and identification information of the input device 14 (hereinafter, referred to as "controller ID"). The control unit 50 performs various kinds of processing by executing the firmware stored in the memory 54. Moreover, the control unit 50 notifies the controller ID to the game apparatus 12 when the input device 14 is wireless-communicably connected with the game apparatus 12. Although detailed description is omitted, the controller ID is added to the vibration data and the operation data, whereby the input device 14 that should receive the vibration data can be identified, and the input device 14 that is a transmission source of the operation data can be identified.

Information (operation data) concerning with an operation that is performed to the operation button group 56 and the analog stick 58 is repeatedly output to the control unit 50 with a predetermined period. However, the operation button group 56 is equivalent to various kinds of operation buttons (56a-56e) described above, and outputs the operation data representing an input situation (whether depressed or not) to the various kinds of operation buttons (56a-56e) to the control unit 50. The analog stick 58 outputs operation data representing a direction that a stick portion is tilted (or slid) and a tilted (or slid) amount thereof to the control unit 50. Hereinafter, in this embodiment, in describing a direction that the stick portion is tilted, respective directions, up and down direction, left and right direction and diagonal direction at the time of viewing a plane of the input device 14 provided with the operation buttons (56a-56e) and the analog stick 58 from the front will be used.

The motor driver 60 controls an operation of the vibration motor 62 under instructions of the control unit 50. In this embodiment, when receiving (acquiring) the vibration data from the game apparatus 12, the control unit 50 outputs the acquired vibration data to the motor driver 60. The motor driver 60 generates a drive signal for vibrating the vibration motor 62 from the vibration data acquired from the control unit 50, and applies the generated drive signal to the vibration motor 62. Therefore, the vibration motor 62 operates according to the vibration data from the game apparatus 12.

Such a game apparatus 12 has a function of limiting the time for playing a game on a day, and for example, a guardian can manage the time when a child plays a game. Moreover, when a guardian plays a game, it is possible to cancel such limitation temporarily. In this case, it is required to input a personal identification number (Pin).

In addition, although detailed description is omitted, when a power supply of the game apparatus 12 is turned on, the overall processing of a game is started, and a home screen capable of selecting executing an application including the main body function or making various setting is displayed on the television 16. In this home screen, setting of a function to restrict the time to play a game is selected. Moreover, canceling the limitation temporarily is also selected in the home screen.

Figure 4:
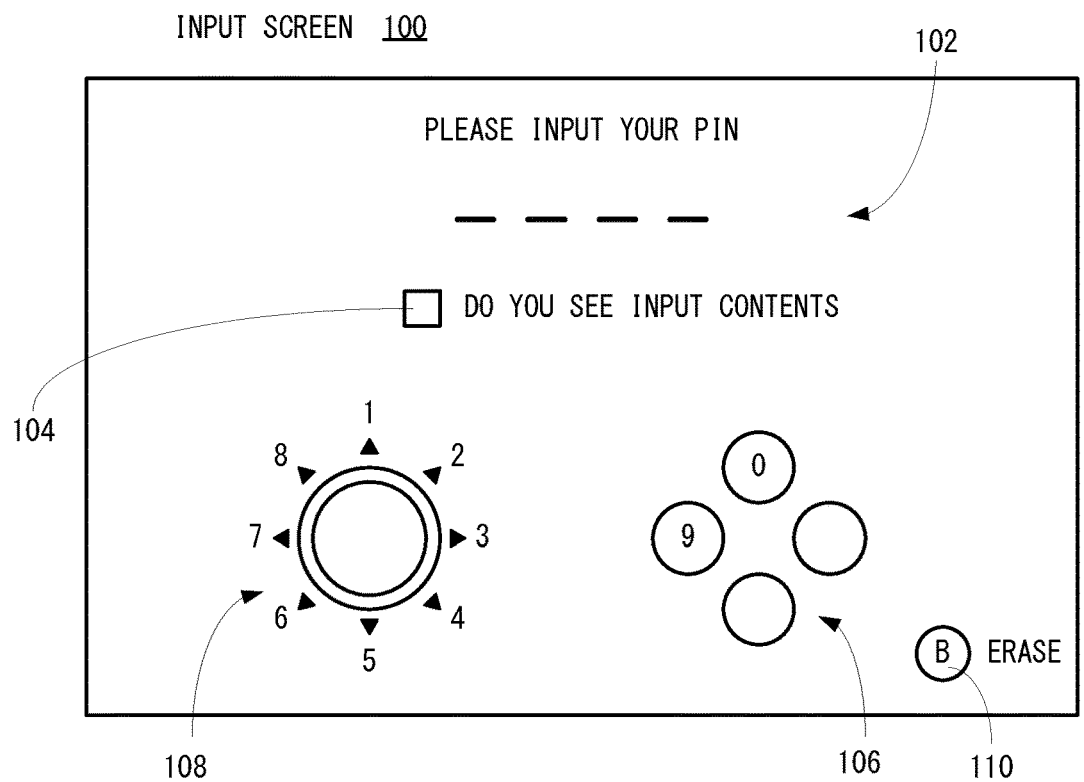
FIG. 4 is an illustration view showing a first non-limiting example input screen.

FIG. 4 is an illustration view showing a non-limiting example input screen 100 displayed on the television 16. The input screen 100 is a screen for inputting a Pin, and has an area 102 capable of displaying the input Pin. However, FIG. 4 shows an input screen 100 prior to inputting a Pin, i.e., an initial screen. A check box 104 for setting whether the user wishes to see the input content is formed below the area 102. Moreover, below the check box 104, designation images 106, 108 and 110 showing an operation method for inputting a Pin are displayed.

In the area 102, the input Pin or predetermined characters instead of the Pin are displayed. It is possible to set whether the Pin is to be displayed or the predetermined characters (for example, circular mark "o") instead of the Pin is to be displayed according to whether the check box is checked or not. In this embodiment, a Pin is input sequentially from a top (first) digit (left end digit).

The designation image 106 and the designation image 108 are images showing how to input a numeral. The designation image 106 is an image corresponding to the A button 56a, the B button 56b, the X button 56c and the Y button 56d, and the designation image 108 is an image corresponding to the analog stick 58. Moreover, numerals that are input by depressing the X button 56c and the Y button 56d are displayed in the images corresponding to the X button 56c and the Y button 56d within the designation image 106. Furthermore, in the designation image 108 corresponding to the analog stick 58, a numeral that is input by using the analog stick 58 is indicated together with a triangular image showing a direction that the stick portion should be tilted.

Specifically, in the designation image 106 and the designation image 108, a numeral that is a target that is input (hereinafter, simply referred to as an "input target") is displayed when operating the operation buttons (56a-56d) and the analog stick 58. In this embodiment, "0" is assigned corresponding to the X button 56c, and "9" is assigned corresponding to the Y button 56d. Moreover, as for the analog stick 58, "1" is assigned corresponding to an upper direction of the stick portion, "2" is assigned corresponding to an upper right diagonal direction, "3" is assigned corresponding to a right direction, "4" is assigned corresponding to a lower right diagonal direction, "5" is assigned corresponding to a lower direction, "6" is assigned corresponding to a lower left diagonal direction, "7" is assigned corresponding to a left direction, and "8" is assigned corresponding to an upper left diagonal direction (see FIG. 7A-FIG. 7D).

Therefore, when depressing the X button 56c, "0" can be input, and when depressing the Y button 56d, "9" can be input. Moreover, as for the analog stick 58, "1" can be input when tilting the stick portion to the upper direction, "2" can be input when tilting to the upper right diagonal direction, "3" can be input when tilting to the right direction, "4" can be input when tilting to the lower right diagonal direction, "5" can be input when tilting to the lower direction, "6" is assigned corresponding to the lower left diagonal direction, "7" can be input when tilting to the left direction, and "8" can be input when tilting to the upper left diagonal direction.

Moreover, the designation image 110 is displayed on the right from the designation image 106, and an image designating a method of erasing the numeral. The designation image 110 shows that a numeral that is input immediately before can be erased by depressing the B button 56b. However, if the B button 56b is depressed continuously, the numerals are erased in a reverse order of an input order each time that the B button 56b is pressed.

In a case of inputting a numeral with using the analog stick 58, the user tilts the stick portion to a direction that is associated with a numeral that should be input from a state where the stick portion is not tilted so as to designate an input area 200 that is set corresponding to the desired numeral, and then, returns the stick portion to the state where the stick portion is not tilted (hereinafter, referred to as an "original state"). Thus, a numeral assigned to the designated input area 200 can be input. Hereinafter, the input area 200 that is designated by the stick portion may be referred to as a "designated area".

Thus, numerals are input sequentially from the top (first) digit. If the numerals of all the digits (in this embodiment, numerals of four (4) digits) are input, that is, if it is determined that the Pin is input, authentication processing of the Pin is automatically performed. However, if the user tilts the stick portion in a direction different from the direction with which the numeral to be input is associated, the user can correct the direction of the stick portion to the direction with which the numeral to be input is associated by rotating the stick portion in a tilted state in a circumferential direction. Moreover, the authentication processing of the Pin may be performed in response to depression of a predetermined operation button (for example, the A button 56a).

In addition, a plurality of input areas 200 (eight (8) input areas 200 in this embodiment) that are set in the analog stick 58 will be described later in detail.

However, sometime there occurs when tilting the stick portion and returning it to the original state, a further input area 200 adjacent to the input area 200 that is set corresponding to a desired numeral is designated due to an unintentional motion of the hand or the like. Therefore, in this embodiment, when a time period of designating the same input area 200 is equal to or longer than a predetermined time period, a numeral assigned to that input area 200 can be set into an input enable state. Therefore, an erroneous input is reduced. For example, the predetermined time period is four (4) frames.

Moreover, a frame is a screen renewal unit time, and 1/60 seconds, for example. However, a state where an input can be performed (hereinafter, referred to as "input enable state") means a state that is decided as an input numeral when assuming that the stick portion is returned to the original state. As described later, since the current input enable state is set to the origin O when the stick portion is returned to the original position, the numeral in the input enable state before being set to the origin O is input to a digit that should be currently input.

Moreover, in this embodiment, the vibration motor 62 is driven when the numeral in the input enable state is set or changed. However, the numeral in the input enable state is set or changed when any one of the input areas 200 is designated by tilting the stick portion from the state where the stick portion is not tilted, when the input area 200 that is to be designated is changed in a case where the stick portion is rotated in a tilted state, or when the stick portion is returned to the original position. Moreover, in this embodiment, an operation of rotating the stick portion in a tilted state is such that, in a state where the stick portion is tilted, a head portion of the stick portion (hereinafter, referred to as "operating portion") is operated so as to be moved in the clockwise or counterclockwise circumferential direction. That is, an operation of rotation does not limited to an operation that the operating portion of the stick portion is moved only in one direction.

Figure 5:
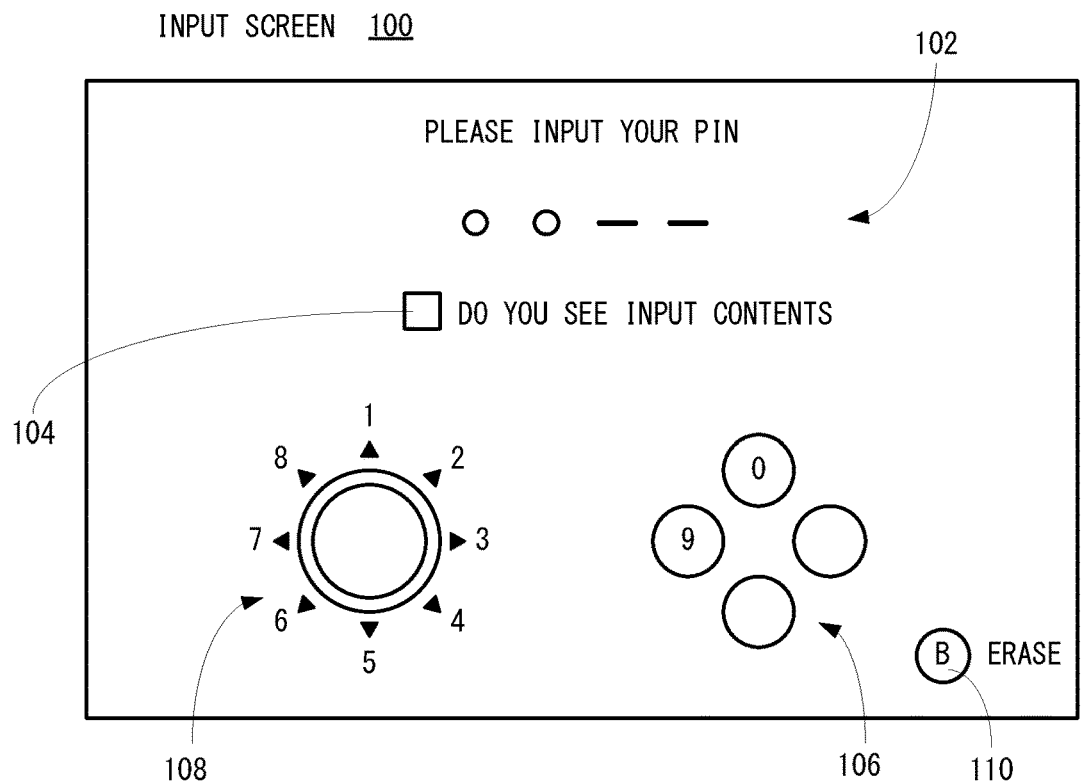
FIG. 5 is an illustration view showing a second non-limiting example input screen.
Figure 6:
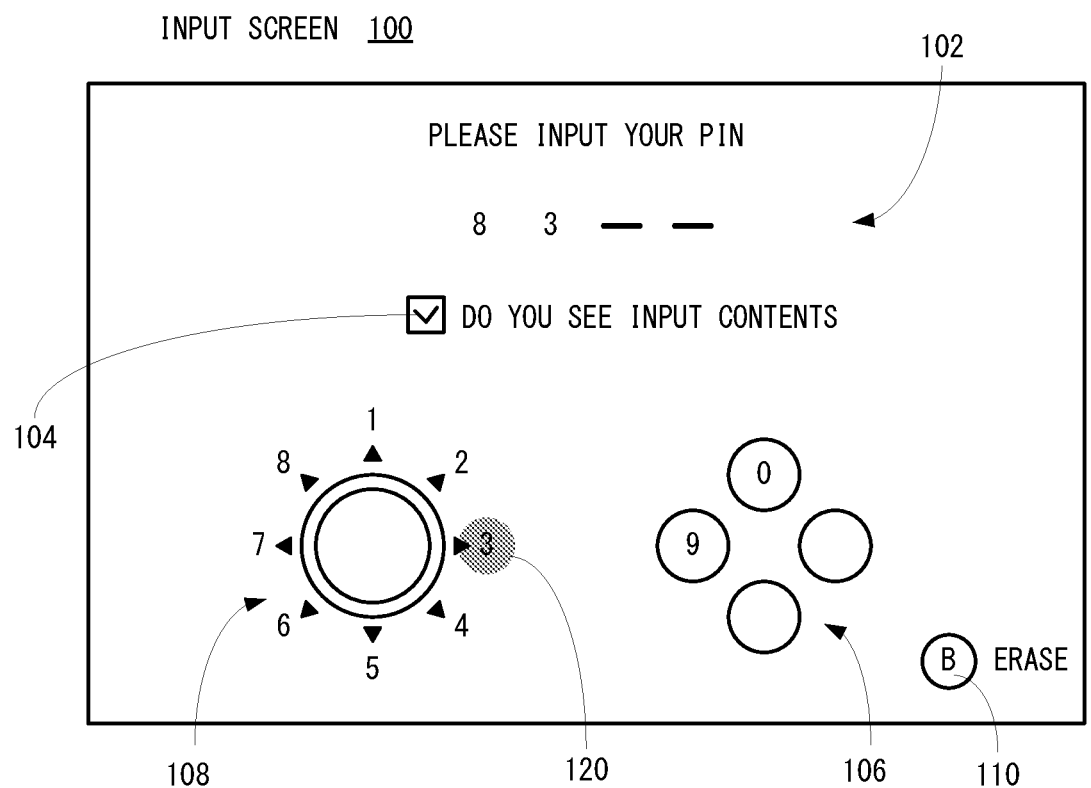
FIG. 6 is an illustration view showing a third non-limiting example input screen.

Although detailed description is omitted, when showing the input content in the input screen 100, prior to a numeral is input to the digit that should be currently input, in the area 102, a numeral in the input enable state is displayed at the digit that should be currently input, and a numeral in the input enable state is displayed in the designation image 106 or the designation image 108 in an identifiable manner (see FIG. 6). In this embodiment, when the check box 104 is not checked as shown in FIG. 5, since the input Pin is not shown, predetermined letters or characters are displayed in the area 102 instead of the numerals. In this case, even if a numeral is input, the numeral is never displayed in an identifiable manner in the designation image 106 and the designation image 108. A display mode in a case where the input Pin is thus not shown may be referred to as a first mode.

On the other hand, when the check box 104 is checked as shown in FIG. 6, the input Pin is displayed in the area 102. In this case, also in the designation image 106 and the designation image 108, a numeral in the input enable state or a numeral that is input this time is displayed in an identifiable manner. In this embodiment, in the designation image 106 and the designation image 108, a numeral in the input enable state or a numeral that is input this time is displayed in an emphasized manner. For example, as a background of the numeral, a circular image 120 painted with a color different from the numeral is displayed. This is merely an example, and a color of the numeral itself may be changed, the numeral may be blinked, or a size of the numeral may be enlarged. Although illustration is omitted, this also applies to a case where the X button 56c or the Y button 56d is depressed. A display mode in a case where the input Pin is shown may be referred to as a second mode.

In addition, in this embodiment, when putting the check into the check box 104, a numeral that is input in the area 102 is displayed and a numeral that is input in the designation image 106 and the designation image 108 this time is displayed in an emphasized manner, but, these may be individually set.

Moreover, as shown in FIG. 4-FIG. 6, before inputting a numeral, a crossbar symbol is displayed at each digit in the area 102.

As described above, if numerals of four (4) digits are input, the authentication processing of the Pin will be performed. The Pin is set in advance, and it is determined in the authentication processing whether the input Pin corresponds to the Pin set in advance. If the authentication succeeds, it is possible to temporarily cancel the restrict on the time to play. If the authentication fails, the restrict on the time to play cannot be canceled, and instead of the input screen 100 or on the front of the input screen 100, a message indicating this is displayed.

Figure 7A:
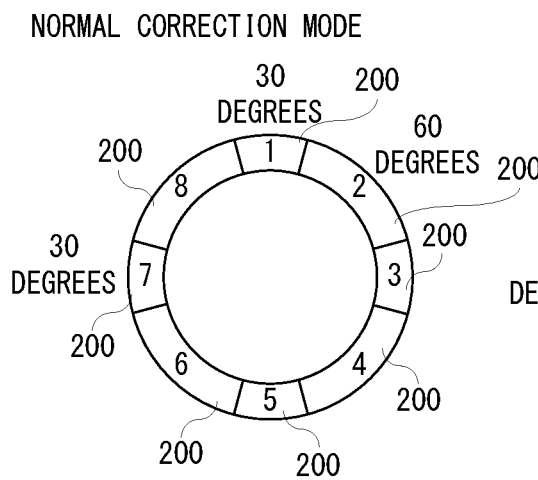
FIG. 7A is an illustration view showing a non-limiting example plurality of input areas that are set to a non-limiting example analog stick in a normal correction mode.
Figure 7B:
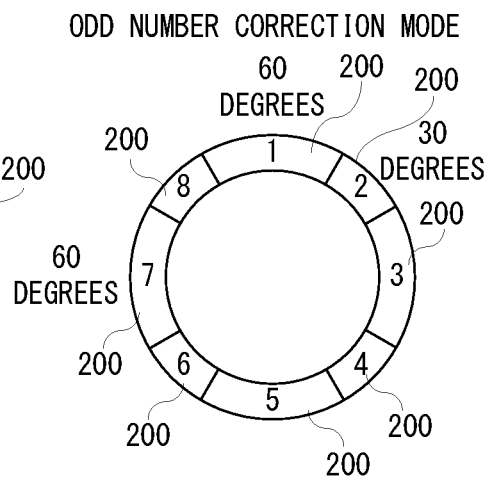
FIG. 7B is an illustration view showing a non-limiting example plurality of input areas that are set to the analog stick in an odd number correction mode.
Figure 7C:
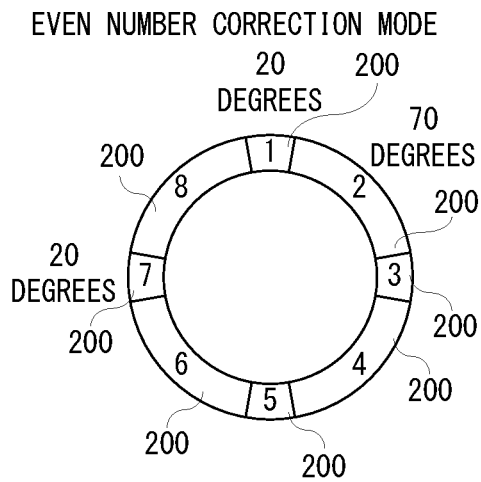
FIG. 7C is an illustration view showing a non-limiting example plurality of input areas that are set to the analog stick in an even number correction mode.
Figure 7D:
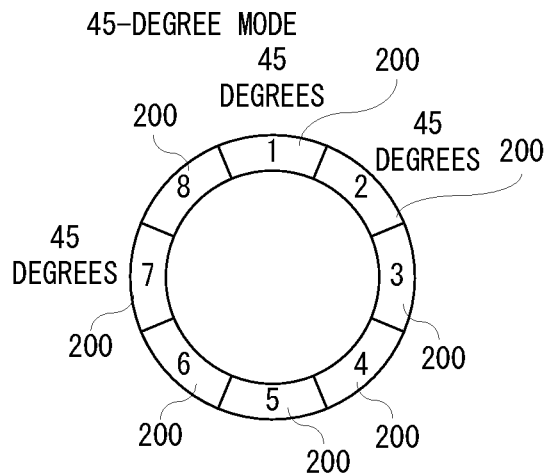
FIG. 7D is an illustration view showing a non-limiting example plurality of input areas that are set to the analog stick in a 45-degree mode.

FIG. 7A is an illustration view showing a non-limiting example plurality of input areas 200 that are set to the analog stick 58 in a normal correction mode, FIG. 7B is an illustration view showing a non-limiting example plurality of input areas 200 that are set to the analog stick 58 in an odd number correction mode, FIG. 7C is an illustration view showing a non-limiting example plurality of input areas 200 that are set to the analog stick 58 in an even number correction mode, and FIG. 7D is an illustration view showing a non-limiting example plurality of input areas 200 that are set to the analog stick 58 in a 45-degree mode.

A size of each of the eight (8) input areas 200 that are set to the analog stick 58, that is, a width in a circumferential direction is changed in accordance with a display mode, a numeral that should be input (or a direction to tilt the stick portion) or whether the stick portion is being rotated in the tilted state. As described above, the sizes of the eight (8) input areas 200 are set in one of modes in the normal correction mode, the odd number correction mode, the even number correction mode and the 45-degree mode (hereinafter, referred to as "angle mode").

However, in FIG. 7A-FIG. 7D, an angle indicating a scale of the size of the input area 200 is a central angle when a sector shape is formed by extending a line segment defining the circumferential width of the input area 200 toward the center of the ring. In the following, the same is applied to a case where the sizes of the input areas 200 are described using angles.

As shown in FIG. 7A, in the normal correction mode of this embodiment, the central angle of each input area 200 in the diagonal directions in which numerals "2", "4", "6" and "8" are assigned is set as 60 degrees, and the central angle of each of the input areas 200 in the up and down direction and the left and right direction in which numerals "1", "3", "5" and "7" are assigned is set as 30 degrees.

As shown in FIG. 7B, in the odd number correction mode, the input areas 200 to which the odd numbers are assigned in the normal correction mode are made large, and the input areas 200 to which the even numbers are assigned in the normal correction mode are made small. In this embodiment, the angle of each of the input areas 200 to which the odd numbers are assigned is set to 60 degrees, and the angle of each of the input areas 200 to which the even numbers are assigned is set to 30 degrees. This is for making it easy to input the odd numbers. Conversely, it is for making difficult to input the even numbers. That is, an erroneous input is reducible.

As shown in FIG. 7C, in the even number correction mode, the input areas 200 to which the even numbers are assigned in the normal correction mode are made large, and the input areas 200 to which the odd numbers are assigned in the normal correction mode are made small. In this embodiment, the angle of each of the input areas 200 to which the even numbers are assigned is set to 70 degrees, and the angle of each of the input areas 200 to which the odd numbers are assigned is set to 20 degrees. This is for making it easier to input the even numbers than a case of the normal correction mode. Conversely, it is for making difficult to input the odd numbers. That is, an erroneous input is reducible.

As shown in FIG. 7D, in the 45-degree mode, the eight (8) input areas 200 are set to equal sizes. That is, the central angle of each of the eight input areas 200 is set to 45 degrees.

As described above, a numeral that can be input is assigned to a tilted direction of the stick portion in the analog stick 58, and the input area 200 for detecting the tilted direction of the stick portion is provided corresponding to each numeral. That is, the numerals that are input targets are assigned to the eight input areas 200, respectively. In this embodiment, as shown in FIG. 7A-FIG. 7D, the eight input areas 200 are arranged in a ring shape. Moreover, each input area 200 is set in a belt like shape that constitutes a part of the ring.

In a case where the degree of difficulty of the operation according to a direction that the stick portion is tilted is not taken into account, it is usual to set the eight input areas 200 to the analog stick 58 with equal sizes, and in such a case, the angle mode is set to the 45-degree mode as shown in FIG. 7D.

However, compared with a case where the stick portion is to be tilted in the up and down (vertical) direction or the left and right (horizontal) direction, it is more difficult to tilt the stick portion in the diagonal direction. Moreover, when not displaying the input numeral in the input screen 100 in an identifiable manner, it is difficult to know having performed an erroneous input.

Therefore, in the game apparatus 12 of this embodiment, the angle mode is set to the normal correction mode when the display mode is set to the second mode, and when the display mode is set to the first mode, the angle mode is set to the odd number correction mode or the even number correction mode according to whether a numeral that should be input (hereinafter, referred to as "correct answer numeral") is the odd number or the even number, thereby to reduce an erroneous input caused by the above-described difficulty.

Thus, when the display mode is set as the first mode, the angle mode is set according to whether the correct answer numeral is the odd number or the even number. As shown also in FIG. 7B and FIG. 7C, in the odd number correction mode, the input areas 200 to which the odd numbers are assigned are all made large, and in the even number correction mode, the input areas 200 to which the even numbers are assigned are all made large. That is, the input area 200 to which the correct answer numeral is assigned, and some input areas 200 to which the odd number or the even number that are the same as the correct answer numeral are assigned are made large. Moreover, since the odd numbers and the even numbers are assigned alternately in the eight input areas 200, it is possible to be said that the input area 200 to which the correct answer numeral is assigned and the input areas 200 that are not adjacent to this input area 200 are made large.

In addition, in this embodiment, not only the input area 200 to which the correct answer numeral is assigned but some other input areas 200 to which the odd numbers or the even numbers that are the same as the correct answer numeral are assigned are made large, this is for making it more difficult to predict the correct answer numeral because a plurality of enlarged input areas 200 become to have the same intervals at which the vibration are perceived when rotating the stick portion in the circumferential direction in the tilted state. Therefore, also when the correct answer numeral is "9" or "0", the odd number correction mode or the even number correction mode is set.

Moreover, only the input area 200 to which the correct answer numeral is assigned is made large, and the two input areas 200 adjacent to this input area 200 may be made small. However, when the width in the circumferential direction of the input area 200 to which the correct answer numeral is assigned is enlarged only in one direction, one input area 200 that is adjacent to this input area 200 at a side that the width is enlarged is made small. That is, since at least one of the input areas 200 to which an incorrect answer numeral is assigned is made small, it is possible to make it difficult to input the incorrect answer numeral.

Moreover, when inputting a Pin, it is possible to know numerals of respective digits of the Pin because the Pin is set in advance. Therefore, when a user inputs a Pin without displaying the input content in the first mode, a correct answer numeral for each digit is acquired from the Pin having been in advance (hereinafter, may be referred to as "correct Pin"), whereby the odd number correction mode or the even number correction mode can be set in accordance with the acquired correct answer numeral.

Furthermore, a reason why the 45-degree mode is set as the angle mode is that it is possible to know differences in size between the input areas 200 based on intervals at which vibrations are perceived if the stick portion is rotated in the circumferential direction in a state where the stick portion is being tilted (hereinafter, simply referred to as "the stick portion is rotated") because the angle mode is set to the odd number correction mode or the even number correction mode according to the correct answer numeral when the display mode is set to the first mode. That is, it is because there is a possibility that the correct answer numeral will be known by the third party.

Therefore, in this embodiment, if an operation that the stick portion is rotated is detected when the normal correction mode, the odd number correction mode or the even number correction mode is set, the angle mode is set to the 45-degree mode in order to prevent the correct answer numeral from being known by the third party by vibration.

However, when the angle mode is changed to the 45-degree mode from the normal correction mode, the odd number correction mode or the even number correction mode, the vibration occurs if a numeral in the input enable state is changed in response to the input area 200 is changed, and a numeral that is displayed at a digit that should be currently input in the area 102 and a numeral that is displayed in an emphasized manner in the designation image 106 or the designation image 108 is further changed in the normal correction mode, and therefore, there is a possibility that user may feel uncomfortable. Therefore, it is necessary to avoid such inconvenience.

In addition, although detailed description is omitted, when the user sets a Pin, at the time of a first input, the normal correction mode is set irrespective of the display mode, and at the time of a second input for confirming the Pin to be set, if the display mode is set to the first mode, the odd number correction mode or the even number correction mode is set corresponding to the correct answer numeral, as described later. However, when the display mode is set to the second mode, the normal correction mode is set also at the time of the second input.

Figure 8:
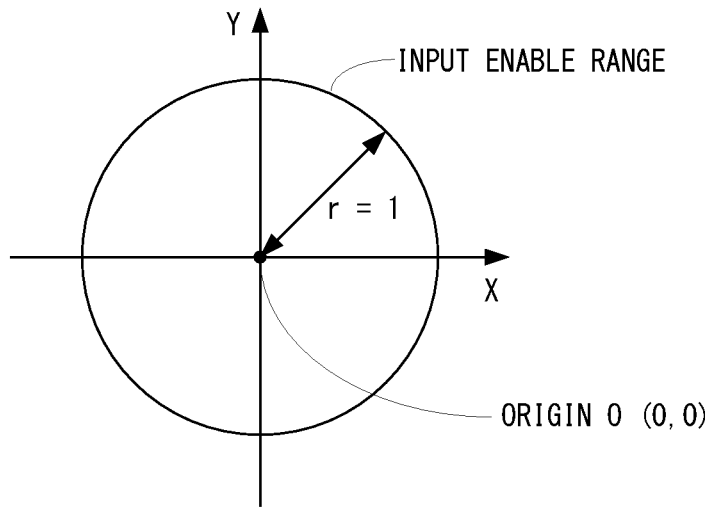
FIG. 8 is an illustration view showing a non-limiting example input enable range of the analog stick.

FIG. 8 is an illustration view showing a non-limiting input enable range when using the analog stick 58. The analog stick 58 can be tilted in an arbitrary direction, and can be rotated in the tilted state, i.e., changed to an arbitrary direction. Therefore, an input enable range is indicated by a circle. In this embodiment, the center of the circle is set as the origin O (0, 0), and the radius r of the circle is set as "1". A point within the input enable range is designated by the stick portion. Hereinafter, the coordinate of the point that is designated by the stick portion is referred to as "stick coordinate". When the stick portion is not tilted, the stick portion designates the point of the center of the input enable range. That is, the origin O is designated. When the stick portion is tilted from a state where the stick portion is not tilted, a point that is designated by the stick portion is changed so as to move away from the origin O as the stick portion is tilted. Inversely, when the stick portion is returned to its original state from a state where the stick portion is tilted, a point that is designated by the stick portion is changed so as to approach the origin O as the stick portion is returned from the tilted state to the original state. When the stick portion is being tilted, the stick coordinate is calculated based on the direction that the stick portion is tilted and a tilted amount thereof.

As shown in FIG. 7A-FIG. 7D, in each angle mode, a plurality of input areas 200 are arranged in a ring shape. In this embodiment, the width in a radial direction of each input area 200 is set within a range defined by the radius r equal to or more than 0.9 and the radius r equal to or less than 1.0, within the input enable range of the analog stick 58. Therefore, when the stick coordinate is included in any one of the plurality of input areas 200 arranged in the ring shape by tilting the stick portion, the one input area 200 in which the stick coordinate is included is determined as a designated area. Moreover, in a range surrounded by the plurality of input areas 200, it is possible to designate only the origin O by not making the stick portion tilt or by returning to the original state from a state where the stick portion is tilted. A reason why the width in the radial direction is thus set to each input area 200 is to prevent as much as possible a numeral that the user does not intend from being input at the time that the user touches the stick portion or the stick portion is made to be returned to its original state. That is, an erroneous input is reducible.

Figure 9:
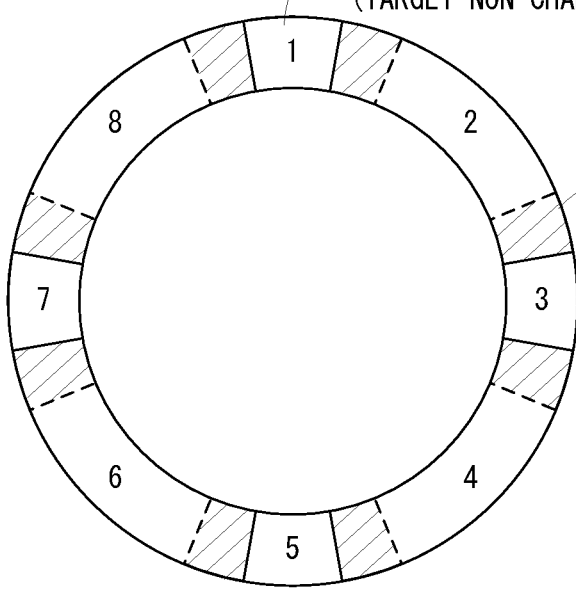
FIG. 9 is an illustration view showing a method of determining whether an angle mode is to be set to the 45-degree mode.

In FIG. 9, the eight input areas 200 in a case where the 45-degree mode is set are shown overlapped with the eight input areas 200 of a case where the even number correction mode is set. In the following, a case of changing from the even number correction mode to the 45-degree mode will be described, but the same applies to a case of changing to the 45-degree mode from the odd number correction mode.

In addition, since in FIG. 9, the eight input areas 200 in a case where the 45-degree mode is set are shown overlapped with the eight input areas 200 of a case where the even number correction mode is set, the reference numerals for the input areas 200 are omitted. This also applies to FIG. 10A-FIG. 10D and FIG. 11A-FIG. 11D described later.

In FIG. 9, line segments defining the widths of the circumferential direction of the input areas 200 of the 45-degree mode are indicated by dotted lines. In a case where an area applied with slant lines is designated, a numeral to be input is changed because the designated input area 200 is changed before and after changing of the angle mode when the angle mode is changed to the 45-degree mode from the even number correction mode. That is, before and after changing the angle mode, a numeral in the input enable state is changed. In the following, in the input areas 200, an area that a numeral to be input is changed when assuming that the angle mode is changed to the 45-degree mode is referred to as a "target changeable area".

For example, in a case shown in FIG. 9, on the assumption that the stick portion of the analog stick 58 is rotated clockwise direction in a state of being tilted, if the angle mode is changed to the 45-degree mode when a designated area is changed to the input area 200 to which "2" is assigned from the input area 200 to which "1" is assigned, when designating the target changeable area within the input area 200 of "2", a numeral to be input is changed to "1" from "2" because a size of the input area 200 is changed.

On the other hand, when an area applied with no slant line is designated, a numaral to be input is not changed even when the angle mode is changed to the 45-degree mode from the even number correction mode because the designated input area 200 is not changed before and after changing the angle mode. In the input areas 200, an area that a numeral to be input is not changed when assuming that the angle mode is changed to the 45-degree mode is referred to a "target non-changeable area".

Therefore, in this embodiment, when the angle mode is changed to the 45-degree mode from the even number correction mode, detecting of an operation to rotate the stick portion in the circumferential direction in a state where the stick portion is tilted is prevented, and changing of a numeral in the input enable state due to a change to the 45-degree mode is also prevented.

Specifically, a first condition and a second condition are provided as conditions that the angle mode is changed to the 45-degree mode from the odd number correction mode or the even number correction mode.

The first condition is that the current designated area and the designated area at the time of assuming that the angle mode is changed to the 45-degree mode are different from each other, i.e., that the current designated area is the target changeable area, or the number of area change times is two (2) or more. The second condition is that the current designated area and the designated area at the time of assuming that the angle mode is changed to the 45-degree mode are the same. That is, when satisfying the second condition, the current designated area is an input area 200 having no target changeable area, or a target non-changeable area within the input area 200. When both the first condition and the second condition are satisfied, that angle mode is changed to the 45-degree mode from the odd number correction mode or the even number correction mode. However, the number of area change times is incremented by one (1) when the current designated area (current frame) and the last time designated area (one frame before) are different from each other. Moreover, in this embodiment, when the number of area change times becomes five (5) times or more without deciding a numeral to be input at the current digit, it is determined that the user is making the stick portion rotate in the circumferential direction in a state where the stick portion is being tilted, and in this case, a numeral in the input enable state is changed according to change of the designated area. That is, a numeral assigned to the current designated area is set as a numeral in the current input enable state. In other word, a numeral in the input enable state is set without a delay with respect to an operation that the user designates the input area 200.

FIG. 10A-FIG. 10D are illustration views showing a non-limiting example case where it is determined that the angle mode is changed to the 45-degree mode from the even number correction mode. Moreover, FIG. 11A-FIG. 11D are illustration views showing a further non-limiting example case where it is determined that the angle mode is changed to the 45-degree mode from the even number correction mode.

In FIG. 10A to FIG. 11D, an arrow mark indicates a direction that the stick portion is tilted or rotated, and a length of the arrow mark indicates a linear changing amount of the stick coordinate when tilting or rotating the stick portion.

Figure 10A:
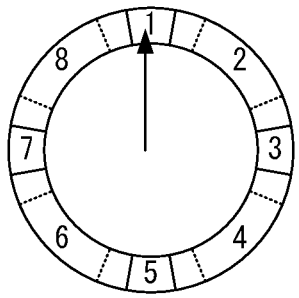
FIG. 10A is an illustration view showing a non-limiting example state where an input area corresponding to an input target "1" is designated.
Figure 10A:
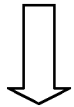

FIG. 10A is an illustration view showing a state where the stick portion is tilted upward from a non-tilted state, thereby designating the input area 200 to which "1" is assigned. In this case, neither the first condition nor the second condition is satisfied. Subsequently, if the user rotates the stick portion rightward in the state shown in FIG. 10A so as to change to a state shown in FIG. 10B, the target changeable area within the input area 200 to which "2" is assigned is designated. The first condition is satisfied at this time. However, the second condition is not satisfied.

Figure 10B:
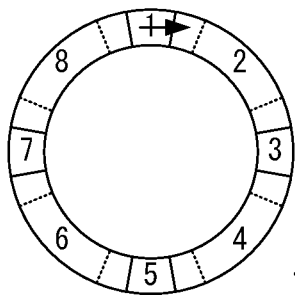
FIG. 10B is an illustration view showing a non-limiting example state where a target changeable area within the input area corresponding to the input target "2" is designated from the state shown in FIG. 10A.
Figure 10B:
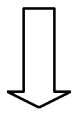
Figure 10B:
Figure 10C:
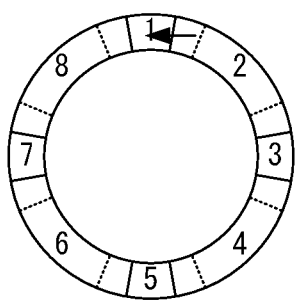
FIG. 10C is an illustration view showing a non-limiting example state where the input area corresponding to the input target "1" is designated from the state shown in FIG. 10B.

If the user rotates the stick portion leftward in the state shown in FIG. 10B so as to change to a state shown in FIG. 10C, the input area 200 to which "1" is assigned is designated. The second condition is satisfied at this time. Therefore, it is determined that the angle mode is changed to the 45-degree mode.

Figure 10D:
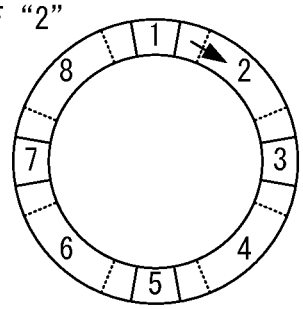
FIG. 10D is an illustration view showing a non-limiting example state where a target non-changeable area within the input area corresponding to the input target "2" is designated from the state shown in FIG. 10B.

Moreover, if the user further rotates the stick portion rightward in the state shown in FIG. 10B so as to change to a state shown in FIG. 10D, the target non-changeable area within the input area 200 to which "2" is assigned is designated. The second condition is satisfied also at this time. Therefore, it is determined that the angle mode is changed to the 45-degree mode.

Although an illustration is omitted, when the stick portion is tilted upward from a non-tilted state, the target changeable area 200 within the input area to which "2" is assigned is designated, the first condition is satisfied at this time. Thereafter, if the state is changed to a state shown in FIG. 10C or FIG. 10D from the state shown in FIG. 10B as described above, the second condition is satisfied, and thus, it is determined that the angle mode is changed to the 45-degree mode.

Figure 11A:
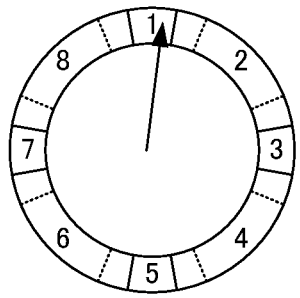
FIG. 11A is an illustration view showing a non-limiting example state where an input area corresponding to an input target "1" is designated.

Moreover, FIG. 11A is an illustration view showing a state where the stick portion is tilted upward from a non-tilted state, thereby to designate the input area 200 to which "1" is assigned. In this case, neither the first condition nor the second condition is satisfied. Subsequently, if the user rotates the stick portion rightward in the state shown in FIG. 11A so as to change to a state shown in FIG. 11B, the target non-changeable area within the input area 200 to which "2" is assigned is designated. Also at this time, neither the first condition nor the second condition is satisfied.

Figure 11B:
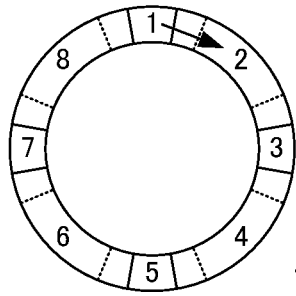
FIG. 11B is an illustration view showing a non-limiting example state where a target non-changeable area within the input area corresponding to the input target "2" is designated from the state shown in FIG. 11A.
Figure 11C:
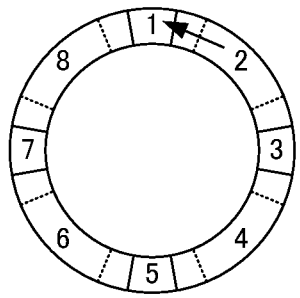
FIG. 11C is an illustration view showing a non-limiting example state where the input area corresponding to the input target "1" is designated from the state shown in FIG. 11B.

If the user rotates the stick portion leftward in the state shown in FIG. 11B so as to change to a state shown in FIG. 11C, the input area 200 to which "1" is assigned is designated. At this time, the number of area change times is two (2), and therefore, the first condition is satisfied. Moreover, since the input area 200 to which "1" is assigned is designated, the second condition is also satisfied. Therefore, it is determined that the angle mode is changed to the 45-degree mode.

Figure 11D:
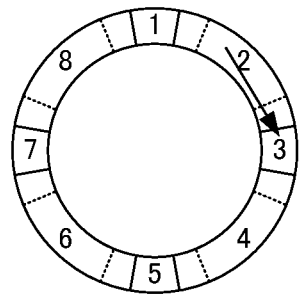
FIG. 11D is an illustration view showing a non-limiting example state where an input area corresponding to an input target "3" is designated from the state shown in FIG. 11B.

Moreover, if the user further rotates the stick portion rightward in the state shown in FIG. 11B so as to change to a state shown in FIG. 11D, the input area 200 to which "3" is assigned is designated. At this time, the number of area change times is two (2), and therefore, the first condition is satisfied. Moreover, since the input area 200 to which "3" is assigned is designated, the second condition is also satisfied. Therefore, it is determined that the angle mode is changed to the 45-degree mode.

Figure 12:
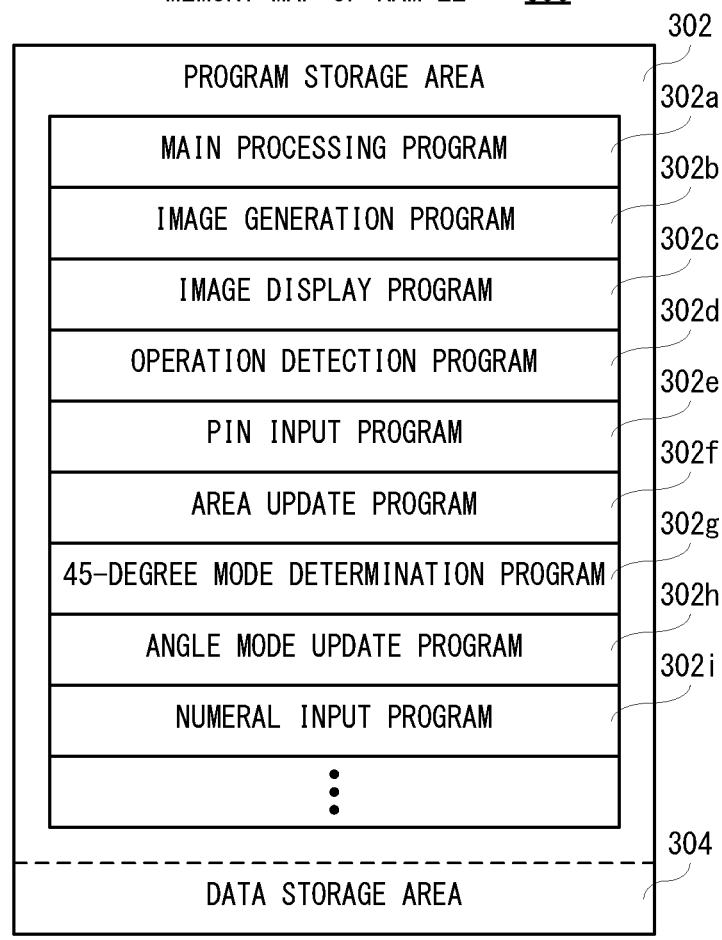
FIG. 12 is an illustration view showing a non-limiting example memory map of a RAM shown in FIG. 2.

FIG. 12 is an illustration view showing a non-limiting example memory map 300 of the RAM 22 of the game apparatus 12 shown in FIG. 2. As shown in FIG. 12, the RAM 22 includes a program storage area 302 and a data storage area 304. The program storage area 302 is stored with an information processing program including a Pin input program 302*e*. For example, the information processing program is partly or entirely read from the flash memory 24, and stored in the RAM 22 at a proper timing after the power supply is applied to the game apparatus 12.

As shown in FIG. 12, the information processing program stored in the RAM 22 includes a main processing program 302*a*, an image generation program 302*b*, an image display program 302*c*, an operation detection program 302*d*, a Pin input program 302*e*, an area update program 302*f*, a 45-degree mode determination program, an angle mode update program 302*h*, a numeral input program 302*i*, etc.

The main processing program 302*a* is a program for executing processing of a main routine of the game apparatus 12. The image generation program 302*b* is a program for generating image data corresponding to various kinds of screens such as the input screen 100 by using image generation data 304*b* described later.

The image display program 302*c* is a program for outputting the image data generated according to the image generation program 302*b* to the television 16 via the AV terminal 30 and the connection cable. Therefore, a screen corresponding to the image data is displayed on the television 16.

The operation detection program 302*d* is a program for detecting operation data that is input or transmitted from the input device 14. The Pin input program 302*e* is a program for inputting a Pin. The area update program 302*f* is a program for updating the designated area. The 45-degree mode determination program 302*g* is a program for determining whether the angle mode is to be set to the 45-degree mode.

The angle mode update program 302*h* is a program for setting the angle mode to any one of the normal correction mode, the odd number correction mode, the even number correction mode and the 45-degree mode. The numeral input program 302i is a program for inputting numerals of respective digits of a Pin.

In addition, a sound output program, a communication program, a backup program, etc. are also stored in the program storage area 302.

Figure 13:
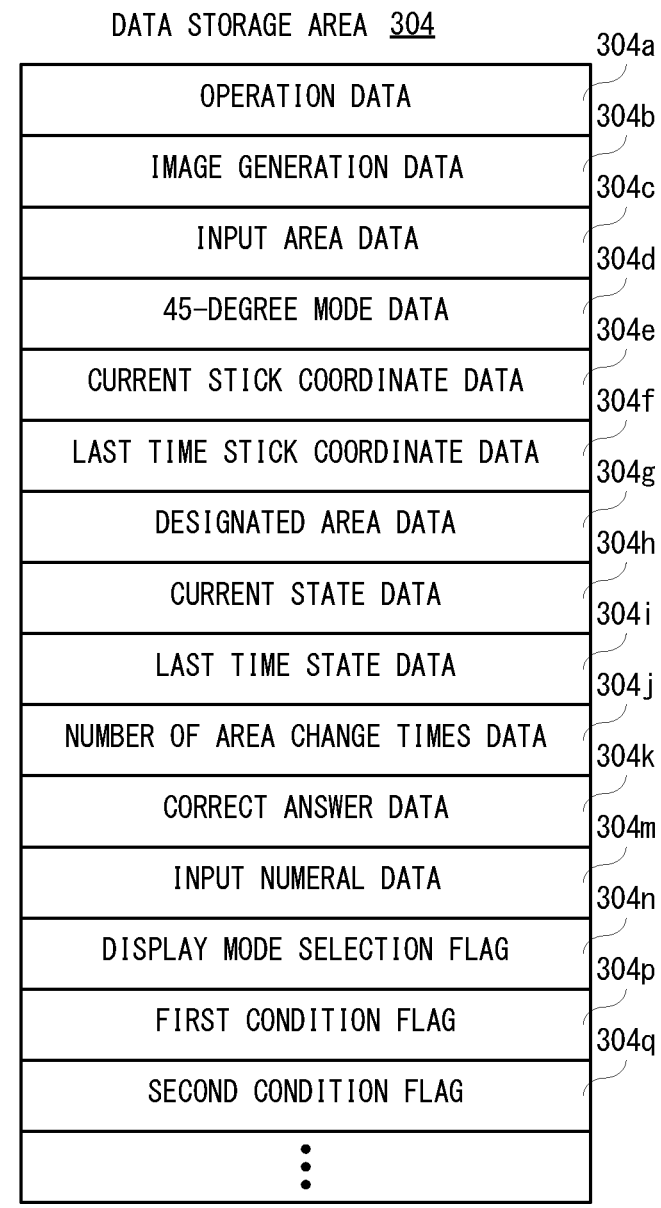
FIG. 13 is an illustration view showing a non-limiting example data storage area shown in FIG. 12.

FIG. 13 is an illustration view showing non-limiting example of specific contents of the data storage area 304 shown in FIG. 12.

The data storage area 304 is stored the operation data 304a, image generation data 304b, input area data 304c, 45-degree mode data 304d, current stick coordinate data 304e, last time stick coordinate data 304f, designated area data 304g, current state data 304h, last time state data 304i, number of area change times data 304j, correct answer data 304k, input numeral data 304m, etc. Moreover, the data storage area 304 is provided with a display mode selection flag 304n, a first condition flag 304p, a second condition flag 304q, etc.

The operation data 304a is data indicative of an operation of the user to the input device 14, and as described above, the operation data is transmitted from the input device 14 so as to be acquired in the game apparatus 12, and stored in the RAM 22. Moreover, the operation data 304a used for the processing of the processor 20 is erased from the RAM 22.

The image generation data 304b is data required in order to generate image data, such as polygon data and texture data. The input area data 304c is data capable of identifying each of the plurality of input areas 200 that are set to the analog stick 58 in the angle mode of the normal correction mode, the odd number correction mode, the even number correction mode or the 45-degree mode. However, the data capable of identifying each of the plurality of input areas 200 is the data of coordinates defining each of the input areas 200. For example, data of coordinates defining each input area 200 is data of a coordinate group corresponding to all points included in each input area 200, or data specifying each input area 200 by using polar coordinates. This also applies to the 45-degree mode data 304d.

The 45-degree mode data 304d is data capable of identifying each of the plurality of input areas 200 that are set to the analog stick 58 in the 45-degree mode, and this data is set separately from the input area data 304c when determining whether the stick portion is being rotated. Therefore, when the current angle mode is the 45-degree mode, the 45-degree mode data 304d is not stored in the data storage area 304.

The current stick coordinate data 304e is data of the stick coordinate of the current frame. The stick coordinate is calculated based on the operation data 304a transmitted from the input device 14, such as the direction that the stick portion is tilted and the tilted amount thereof. However, when detecting the operation data 304a that indicates the coordinate of the origin O, it is not necessary to calculate the stick coordinate.

The last time stick coordinate data 304f is data of the stick coordinate of a previous frame. However, the previous frame means a frame one-frame before the current frame. The designated area data 304g is data indicating a designated area for each of a plurality of continuous frames (5 (five) frames, in this embodiment) up to the current frame.

The current state data 304h is data about a numeral in the input enable state (hereinafter, may be referred to as "state information") at the current frame. The last time state data 304i is data about a numeral in the input enable state immediately before a numeral in the input enable state at the current frame is set or changed. The number of area change times data 304j is data about the number of times that the designated area is changed.

The correct answer data 304k is numerical data about the Pin set in advance. The input numeral data 304m is numeral data about the input Pin. Since numerals are input from the top (first) digit, null data is stored for digits that have not been input.

The display mode selection flag 304n is a flag for determining whether the first mode not showing the input content or the second mode showing the input content is selected as the display mode. This display mode selection flag 304n is turned on when the first mode is selected, and turned off when the second mode is selected.

The first condition flag 304p is a flag for determining whether the first condition is satisfied. This first condition flag 304p is turned on when the first condition is satisfied, and turned off when the first condition is not satisfied. The second condition flag 304q is a flag for determining whether the second condition is satisfied. This second condition flag 304q is turned on when the second condition is satisfied, and turned off when the second condition is not satisfied.

Although illustration is omitted, in the data storage area 304, other data required for performing Pin input processing is stored, and other flags and counters (timers) required for performing the Pin input processing are provided.

Figure 14:
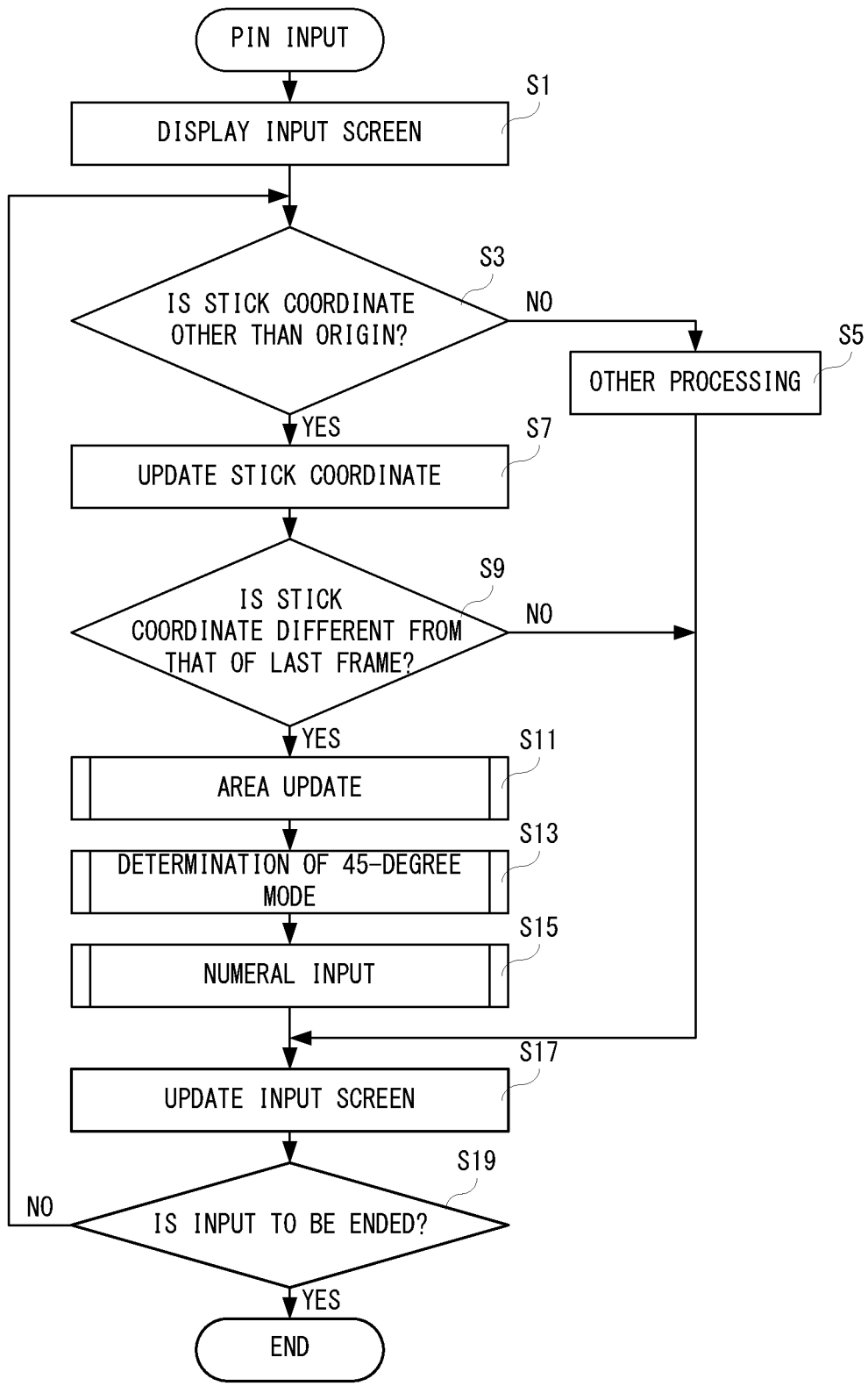
FIG. 14 is a flowchart showing non-limiting example Pin input processing by a processor shown in FIG. 2.

FIG. 14 is a flowchart showing non-limiting example Pin input processing of the processor 20 provided in the game apparatus 12 shown in FIG. 2. In addition, processing of respective steps of flowchart of FIG. 14 (also flowcharts of FIG. 15-FIG. 21 described later) are mere examples, and if the same or similar result is obtainable, an order of the respective steps may be exchanged. Moreover, in this embodiment, basically, it is assumed that the processor 20 executes the processing of each step of the flowcharts shown in FIGS. 14-21; however, some steps may be executed by a processor(s) other than the processor 20 and/or a dedicated circuit(s).

If the power supply of the game apparatus 12 is turned on, prior to execution of the entire game processing, the processor 20 executes a boot program stored in a boot ROM not shown, whereby respective units such as the RAM 32, etc. can be initialized. The game apparatus 12 starts, if the user selects a menu that cancels or performs a predetermined function provided as a main body function, processing that inputs a Pin for canceling or performing the predetermined function (hereinafter, referred to as "Pin input processing").

In addition, the predetermined function is a function to restrict the time to play a game as described above, and as other examples, a function to restrict an age to play a game, a function to download an application, a function purchases contents including an application, etc. correspond.

As shown in FIG. 14, if the Pin input processing is started, the processor 20 displays in a step S1 an initial screen of the input screen 100 as shown in FIG. 4 on the television 16.

In addition, although illustration is omitted, if the Pin input processing is started, the processor 20 performs initial processing before performing the processing of the step S1. The initial processing includes processing setting initial values to various kinds of variables to be used by the Pin input processing. Although described later for details, the various kinds of variables are D0, D1, D2, D3, D4, A0, A1 and C, and the initial value of each of these variables is "0".

Moreover, although illustration is omitted, in parallel to the Pin input processing, the processor 20 performs operation detection processing that is processing to detect the operation data 304a transmitted from the input device 14 and store the detected operation data 304a in the data storage area 304 according to a time series. Therefore, if the stick portion is not tilted, the operation data 304a indicating the coordinate of the origin O, and if the stick portion is tilted, the operation data 304a indicating a tilted direction and a tilted amount are detected.

Subsequently, the processor 20 determines, in a step S3, whether the stick coordinate indicates a position other than the origin O. Here, the processor 20 determines, with reference to the operation data 304a of the current frame, whether the stick coordinate of the current frame indicated by the operation data 304a indicates the coordinate other than the coordinate of the origin O. In addition, when the analog stick 58 is tilted in either direction, the stick coordinate is other than the coordinate of the origin O.

If "NO" is determined in the step S3, that is, if the stick coordinate indicates the coordinate of the origin O, further processing is performed in a step S5, the process proceeds to a step S17. The further processing may be mode selection processing that is to be performed when the user checks the check box 104 in the input screen 100 or when the check box 104 is unchecked, authentication processing of the Pin, and processing when the B button 56b, the X button 56c or the Y button 56d is depressed. As described above, when numerals of four (4) digits are input, the authentication processing of the Pin is performed automatically. Moreover, when the B button 56b is depressed, the last numeral of the Pin having been input by the present is erased. When the X button 56c is depressed, the numeral "0" is input at the digit that should be currently input of the Pin. When the Y button 56d is depressed, the numeral "9" is input at the digit that should be currently input of the Pin.

If "YES" is determined in the step S3, that is, if the stick coordinate is the coordinate other than the coordinate of the origin O, the stick coordinate is updated in a step S7. Here, the processor 20 stores the current stick coordinate data 304e in the data storage area 304 as the last time stick coordinate data 304f, and then, stores data of the stick coordinate of the current frame in the data storage area 304 as the current stick coordinate data 304e.

In a succeeding step S9, it is determined whether the current stick coordinate (of the current frame) differs from the stick coordinate of the last frame. If "NO" is determined in the step S9, that is, if the stick coordinate of the current frame is the same as the stick coordinate of the last frame, the process proceeds to a step S17. On the other hand, if "YES" is determined in the step S9, that is, if the stick coordinate of the current frame differs from the stick coordinate of the last frame, in a step S11, area update processing (see FIG. 15 and FIG. 16) described later will be performed.

In a next step S13, 45-degree mode determination processing (FIG. 17 and FIG. 18) described later is performed, and numeral input processing (FIG. 21) described later is further performed in a step S15. Subsequently, in the step S17, the input screen 100 is renewed. Here, the processor 20 generates image data corresponding to the input screen 100, and outputs the generated image data to the television 16 through the AV terminal 30 and the connection cable. Therefore, the input screen 100 is renewed.

Then, it is determined, in a step S19, whether the input is to be ended. Here, the processor 20 determines whether the user inputs an instruction to end the Pin input processing, or the authentication processing is successful. If "NO" is determined in the step S19, that is, if it is not the end of input, the process returns to the step S3. On the other hand, if "YES" is determined in the step S19, that is, if it is the end of input, the Pin input processing is terminated. The input screen 100 is erased at this time.

In addition, when a sound is to be output in the Pin input processing, in the step S17, the DSP 22c generates sound data under instructions of the processor 20, and the processor 20 outputs the generated sound data to the speaker 16a of the television 16 through the AV-IC 36 and the connection cable.

Figure 15:
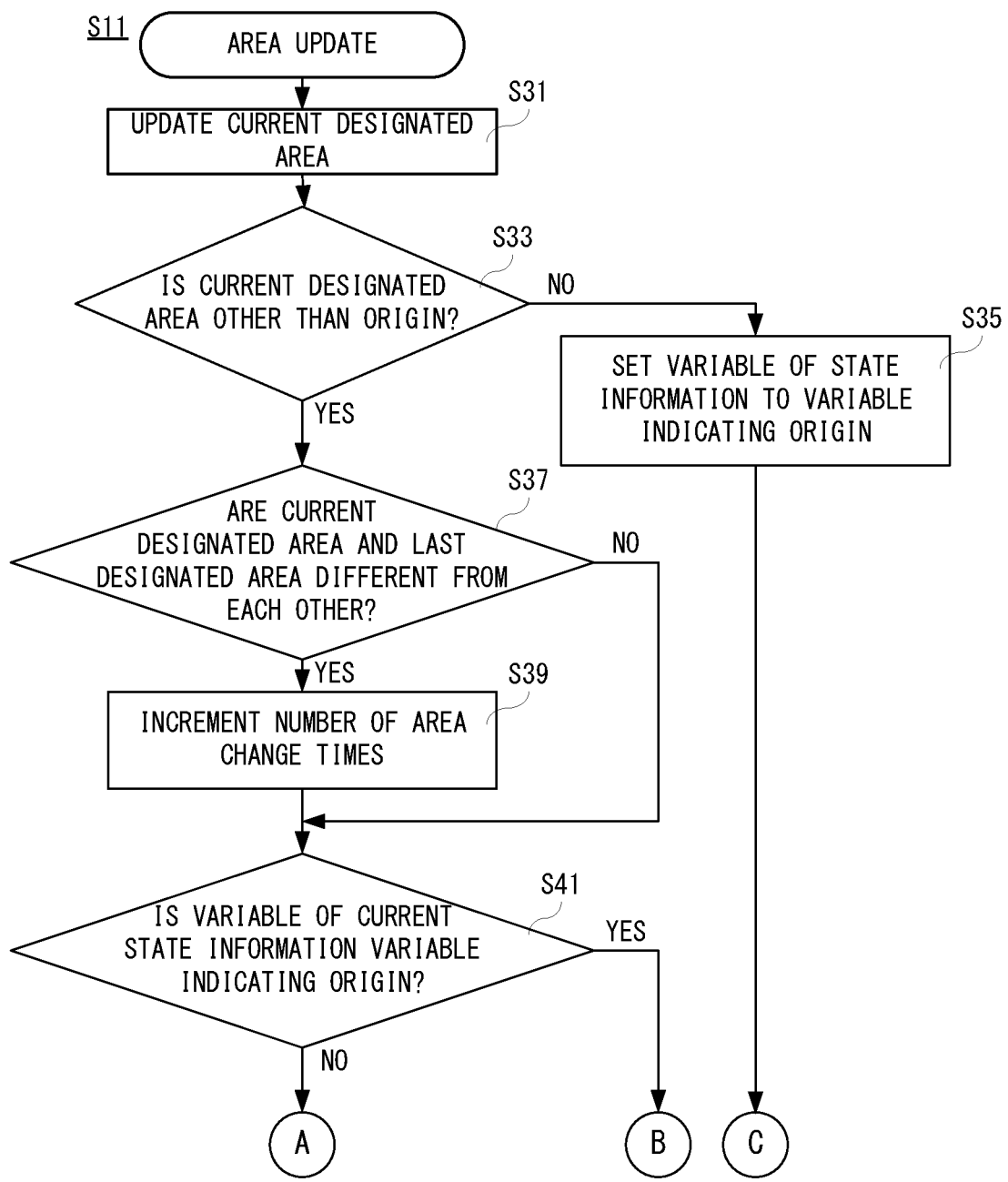
FIG. 15 is a flowchart showing a part of non-limiting example area update processing by the processor shown in FIG. 2.
Figure 16:
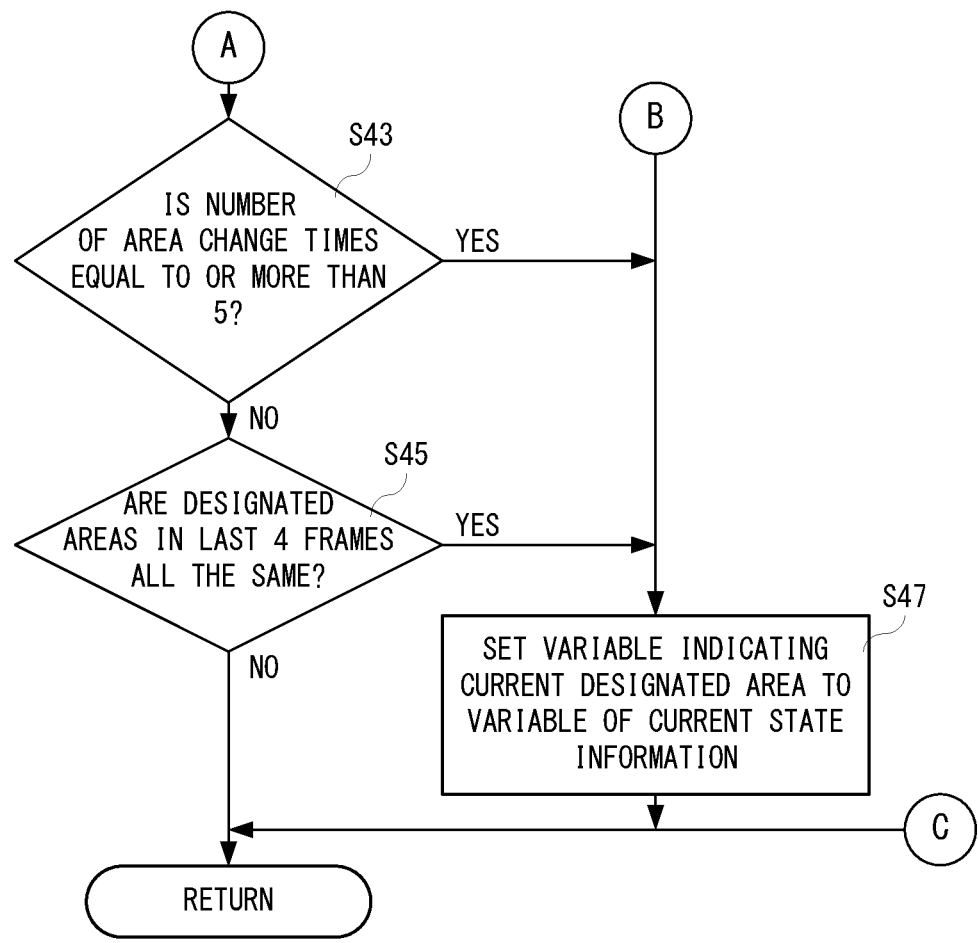
FIG. 16 is a flowchart showing another part of the area update processing by the processor shown in FIG. 2, following FIG. 15.

FIG. 15 and FIG. 16 are flowcharts showing non-limiting example area update processing in the step S11 shown in FIG. 14. As shown in FIG. 15, if the area update processing is started, the processor 20 updates the current designated area. That is, the input area 200 that is currently designated by the stick portion of the analog stick 58, i.e., the designated area is determined, thereby to update the current designated area. However, at this time, not only the designated area at the current frame but also the designated areas at the past four (4) frames are updated.

Specifically, the processor 20 updates the designated area data 304g. As described above, the designated area data 304g is data indicating the input areas for five (5) frames up to the current frame. Here, it is assumed that the variable indicating the designated area at the present (the current frame) is made to be D0, the variable indicating the last time (one-frame before) designated area is made to be D1, the variable indicating the designated area of two-frames before is made to be D2, the variable indicating the designated area of three-frames before is made to be D3, and the variable indicating the designated area of four-frames before is made to be D4, and calculates the variable D0 based on the stick coordinate and the current angle mode, and the variables D1-D4 is substituted with values of the variables D0-D3 immediately before (at the last time frame) (D1=D0, D2=D1, D3=D2, D4=D3).

As an example, the variable indicating the designated area is information for identifying the designated area, and is represented by the numerals "0"-"8". When the analog stick 58 is not tilted and thus the origin O is designated, the numeral "0" is set to the variable D0. In this embodiment, for convenience, "0" is set to the variable D0 when the origin O is designated in order to identify the designated area, but this is different from the numeral "0" as the input target. Moreover, although the origin O is not an area, for the sake of convenience of description, it is assumed that the origin is also a "designated area". This also applies to the variables A0 and A1 of the state information. That is, although the state information is a numeral in the input enable state, since a numeral for the input target is not assigned to the origin O, when the variable indicating the origin O is set to the variables A0 and A1 of the state information, it means that there is not a numeral in the input enable state.

Moreover, when the analog stick 58 is tilted and any one of the input areas 200 is designated, a numeral ("1"-"8") that is the input target and assigned to the designated input area 200 is set as the variable D0. A reason why the input area 200 is thus identified using the numeral assigned to the input area 200 is that the state information indicating a numeral in a current input enable state is updated with the variable indicating the current designated area (see a step S47).

In addition, when starting the Pin input processing, at the beginning, the display mode is set to the first mode, and the odd number correction mode or the even number correction mode is set according to whether a numeral of the correct answer at the top of the Pin is the odd number or even number.

Returning to FIG. 15, it is determined, in a next step S33, whether the current designated area is other than the origin O. That is, the processor 20 determines whether the variable D0 is either of "1"-"8." If "NO" is determined in the step S33, that is, if the current designated area is the origin O, in a step S35, the variable of the state information is set to the variable indicating the origin O (here, numeral "0"), and the area update processing is terminated as shown in FIG. 16 to return to the Pin input processing. However, the variable of the current state information is made to be A0, and the variable of the last state information is made to be A1, and when the variable A0 is updated, the variable A1 is also updated (A1=A0). Therefore, in the step S35, after the value of the variable A0 before updating to the variable A1 is set, "0" is set to the variable A0.

Moreover, if "YES" is determined in the step S33, that is, if the current designated area is other than the origin O, it is determined, in a step S37, whether the current designated area and the last designated area are different from each other. That is, in the step S37, the processor 20 determines whether the variable D0 and the variable D1 are different from each other. If "NO" is determined in the step S37, that is, if the current designated area and the last designated area correspond to each other, the process proceeds to a step S41. On the other hand, if "YES" is determined in the step S37, that is, if the current designated area differs from the last designated area, in a step S39, the number of area change times C is incremented by one (1) (C=C+1), and the process proceeds to the step S41.

In the step S41, it is determined whether the variable of the current state information is the variable indicating the origin O. That is, the processor 20 determines whether the variable A0 is set to "0" with reference to the current state data 304h. If "NO" is determined in the step S41, that is, if the variable of the current state information is not the variable indicating the origin O, the process proceeds to a step S43 shown in FIG. 16. On the other hand, if "YES" is determined in the step S41, that is, if the variable of the current state information is the variable indicating the origin O, the process proceeds to a step S47 shown in FIG. 16.

As shown in FIG. 16, in the step S43, it is determined whether the number of area change times C is equal to five (5) or more. If "YES" is determined in the step S43, that is, if the number of area change times C is equal to 5 or more, it is determined to eliminate the delay in setting the current state information, and the process proceeds to the step S47. On the other hand, if "NO" is determined in the step S43, that is, if the number of area change times C is less than 5, it is determined, in a step S45, whether all the designated areas of the latest four (4) frames are the same. Here, the processor 20 determines whether all the variables D1-D4 correspond to the variable D0.

If "NO" is determined in the step S45, that is, if at least one of the designated areas of the latest four (4) frames differs, the area update processing is terminated to return to the Pin input processing shown in FIG. 14. On the other hand, if "YES" is determined in the step S45, that is, if all the latest four (4) frames are the same designated areas, after setting the variable indicating the current designated area to the variable of the current state information in the step S47, the area update processing is terminated to return to the Pin input processing. That is, the processor 20 is sets the variable D0 to the variable A0, thereby to update the current state data 304h. However, in the step S47, the processor 20 sets the value of the variable A0 to the variable A1 so as to update the last state data 304i before updating the current state data 304h.

Figure 17:
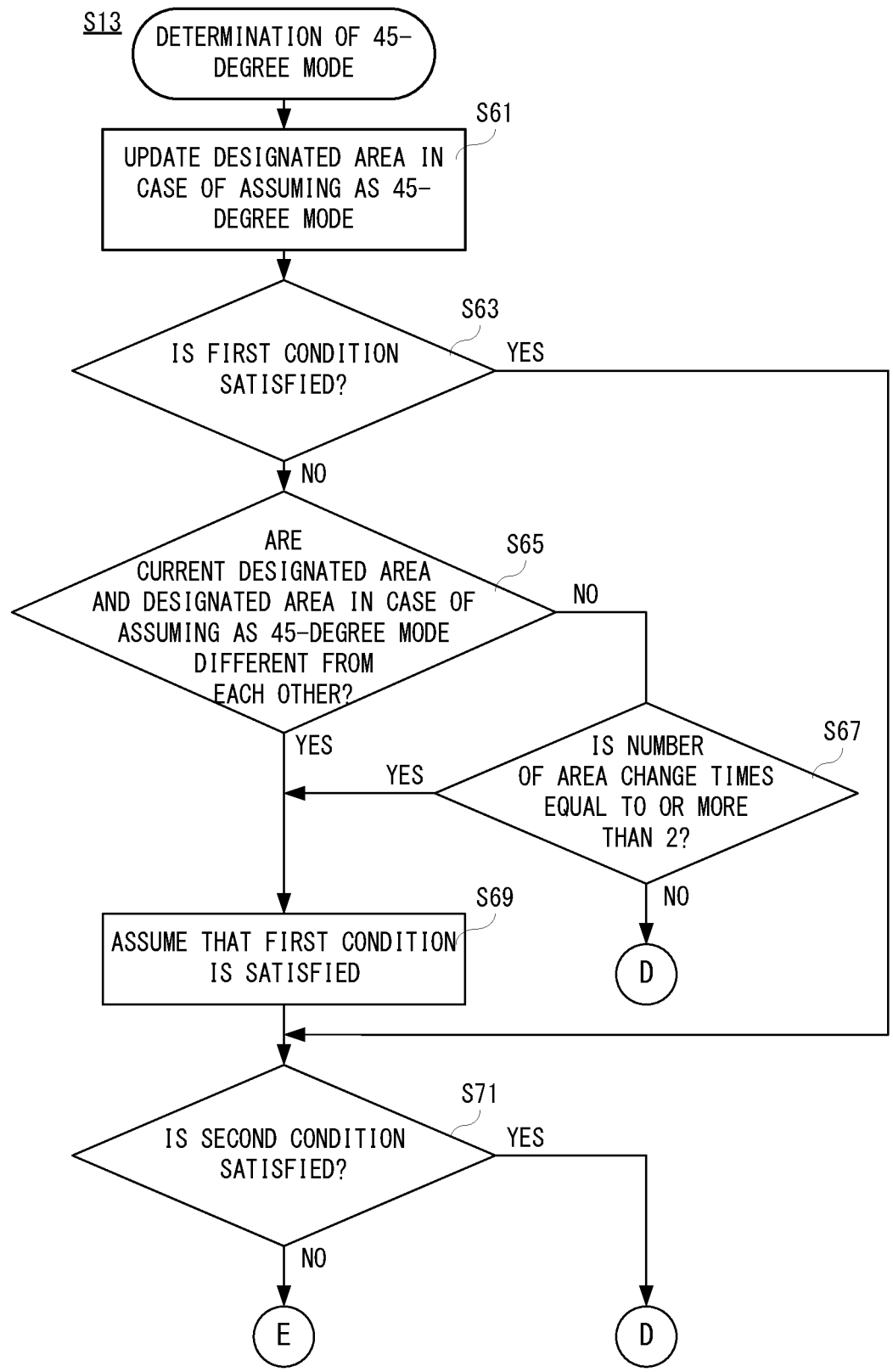
FIG. 17 is a flowchart showing a part of non-limiting example 45-degree mode determination processing by the processor shown in FIG. 2.
Figure 18:
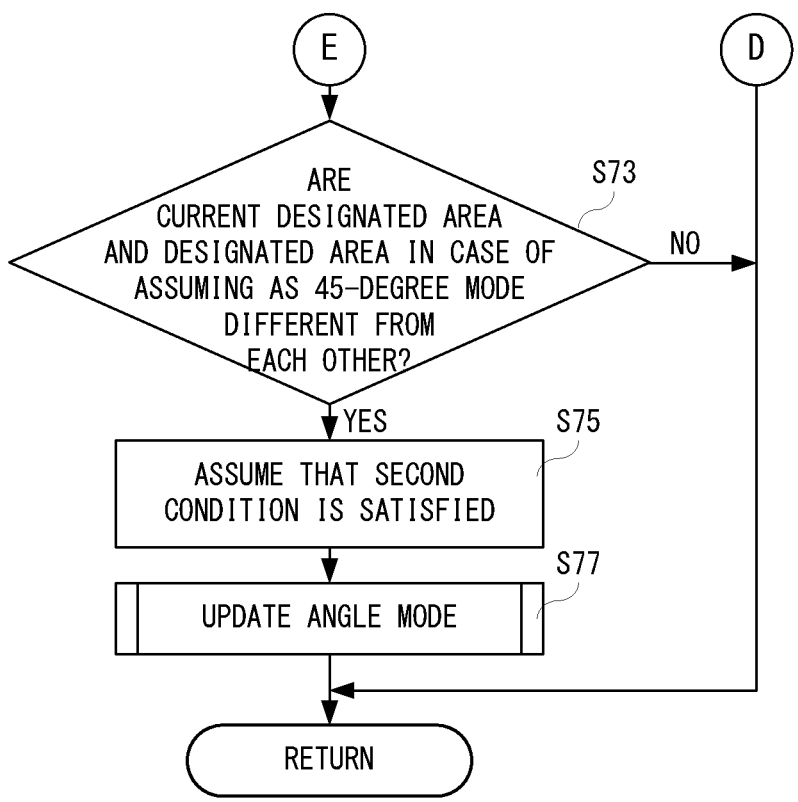
FIG. 18 is a flowchart showing another part of the 45-degree mode determination processing by the processor shown in FIG. 2, following FIG. 17.

FIG. 17 and FIG. 18 are flowcharts of non-limiting example 45-degree mode determination processing in the step S13 shown in FIG. 14. As shown in FIG. 17, if the 45-degree mode determination processing is started, the processor 20 updates, in a step S61, the designated area in a case of assuming that it is the 45-degree mode. However, a variable for identifying the designated area when assuming it is the 45-degree mode is made to be D', which is calculated based on the current stick coordinate and a plurality of input areas 200 set in the 45-degree mode. Therefore, the variable D' is set to either of "1"-"8".

In a next step S63, it is determined whether the first condition is satisfied. Here, the processor 20 determines whether the first condition flag 304p is turned on. If "YES" is determined in the step S63, that is, if the first condition is satisfied, the process proceeds to a step S71. On the other hand, if "NO" is determined in the step S63, that is, if the first condition is not satisfied, it is determined, in a step S65, whether the current designated area (variable D0) and the designated area (variable D') in a case of assuming that it is the 45-degree mode are different from each other. At this time, the processor 20 calculates a value of the variable D' based on the current stick coordinate and the coordinates defining respective input areas 200 indicated by the 45-degree mode data 304d. This also applies to a step S73 described later.

If "YES" is determined in the step S65, that is, when the current designated area differs from the designated area in the case of assuming that it is the 45-degree mode, the process proceeds to a step S69. On the other hand, if "NO" is determined in the step S65, that is, if the current designated area corresponds to the designated area in the case of assuming that it is the 45-degree mode, it is determined, in a step S67, whether the number of area change times C is two (2) or more.

If "NO" is determined in the step S67, that is, if the number of area change times C is less than 2, it is determined that the stick portion of the analog stick 58 is not being rotated, and terminating the 45-degree mode determination processing to return to the Pin input processing shown in FIG. 14. On the other hand, if "YES" is determined in the step S67, that is, if the number of area change times C is 2 or more, it is determined that the stick portion of the analog stick 58 is being rotated, thereby to assume that the first condition is satisfied in the step S69. In this step S69, the processor 20 turns on the first condition flag 304p.

In the step S71, it is determined whether the second condition is satisfied. Here, the processor 20 determines whether the second condition flag 304q is turned on. If "YES" is determined in the step S71, that is, if the second condition is satisfied, the 45-degree mode determination processing is terminated to return to the Pin input processing. On the other hand, if "NO" is determined in the step S71, that is, if the second condition is not satisfied, it is determined, in the step S73 shown in FIG. 18, whether the current designated area (variable D0) and the designated area (variable D') at the time of assuming that it is the 45-degree mode are the same.

If "NO" is determined in the step S73, that is, if the current designated area and the designated area in the case of assuming that it is the 45-degree mode are different from each other, the 45-degree mode determination processing is terminated to return to the Pin input processing. If "YES" is determined in the step S73, that is, if the current designated area and the designated area in the case of assuming that it is the 45-degree mode are the same, it is determined that the numeral that is the input target corresponding to the designated area is not changed even when the angle mode is set or updated to the 45-degree mode, and therefore, it is assumed that the second condition is satisfied in a step S75. That is, the processor 20 turns on the second condition flag 304q. Angle mode update processing (see FIG. 20 and FIG. 21) described later is performed in a step S77, and then, the 45-degree mode determination processing is terminated to return to the Pin input processing.

Figure 19:
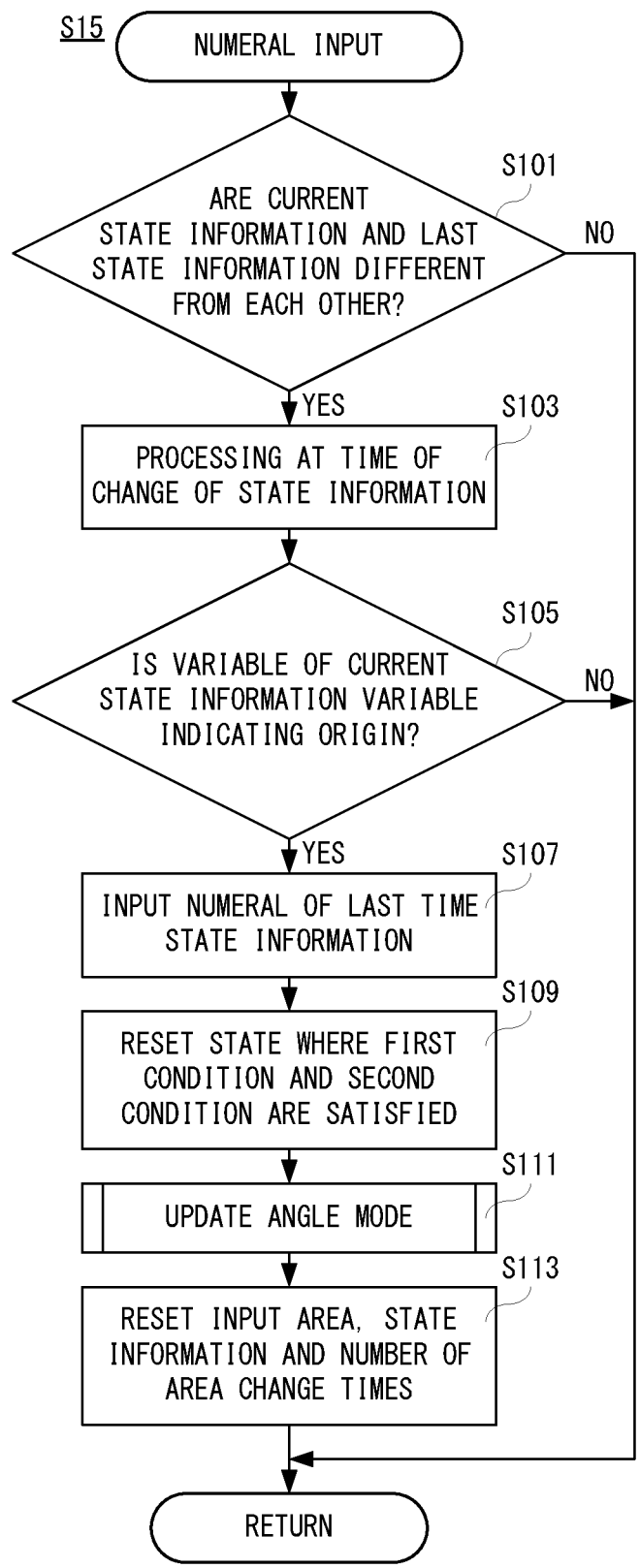
FIG. 19 is a flowchart showing part of a non-limiting example angle mode update processing by the processor shown in FIG. 2.

FIG. 19 is a flowchart of non-limiting example numeral input processing in the step S15 shown in FIG. 14. As shown in FIG. 19, if the numeral input processing is started, the processor 20 determines, in a step S101, whether the current state information and the last state information are different from each other. That is, the processor 20 determines whether the numeral in the current input enable state and the numeral in the last input enable state are different from each other with reference to the current state data 304h and the last state data 304i.

If "NO" is determined in the step S101, that is, if the current state information and the last state information are the same, the numeral input processing is terminated to return to the Pin input processing shown in FIG. 14. On the other hand, if "YES" is determined in the step S101, that is, if the current state information and the last state information are different from each other, processing at the time when the numeral in the input enable state is changed is performed in a step S103. In this embodiment, the processing at the time when the numeral in the input enable state is changed is processing that makes the input device 14 generate the vibration. However, when the display mode is the second display mode, the current numeral in the input enable state or the current input numeral is displayed in an identifiable manner. Therefore, in the step S103, the processor 20 transmits vibration data to the input device 14. However, when the second mode that shows the displayed content is set, the numeral in the current input enable state or the current input numeral is displayed at the digit that should be currently input in the area 102, as processing at the time when the numeral in the input enable state is changed. Moreover, the circular image 120 is displayed on a rear side of the numeral in the current input enable state or the current input numeral out of the numeral displayed in the designation image 106 or the numeral displayed around the designation image 108. That is, the numeral in the current input enable state or the current input numeral is displayed in an identifiable manner.

Subsequently, in a step S105, it is determined whether the variable of the current state information is the variable indicating the origin O. If "NO" is determined in the step S105, that is, if the variable of the current state information is not the variable indicating the origin O, it is determined that the user does not wish to input a numeral, and therefore, the numeral input processing is terminated to return to the Pin input processing. On the other hand, if "YES" is determined in the step S105, that is, if the variable of the current state information is the variable indicating the origin O, it is determined that the user wishes to input a numeral, and the numeral of the last state information is input in a step S107. That is, the numeral in the input enable state, which is the last state information, is input at the digit that should be currently input. At this time, the input numeral data 304m is updated.

In a succeeding step S109, a state where the first condition and the second condition are satisfied is reset. Here, the processor 20 turns off the first condition flag 304p and the second condition flag 304q. In a next step S111, angle mode update processing described later is performed, and in a step S113, the designated area, the state information and the number of area change times are reset, thereby terminating the numeral input processing to return to the Pin input processing. In the step S113, the processor 20 sets the initial value (zero (0) in this embodiment) to each of the variables D0-D4, A0, A1 and C.

Figure 20:
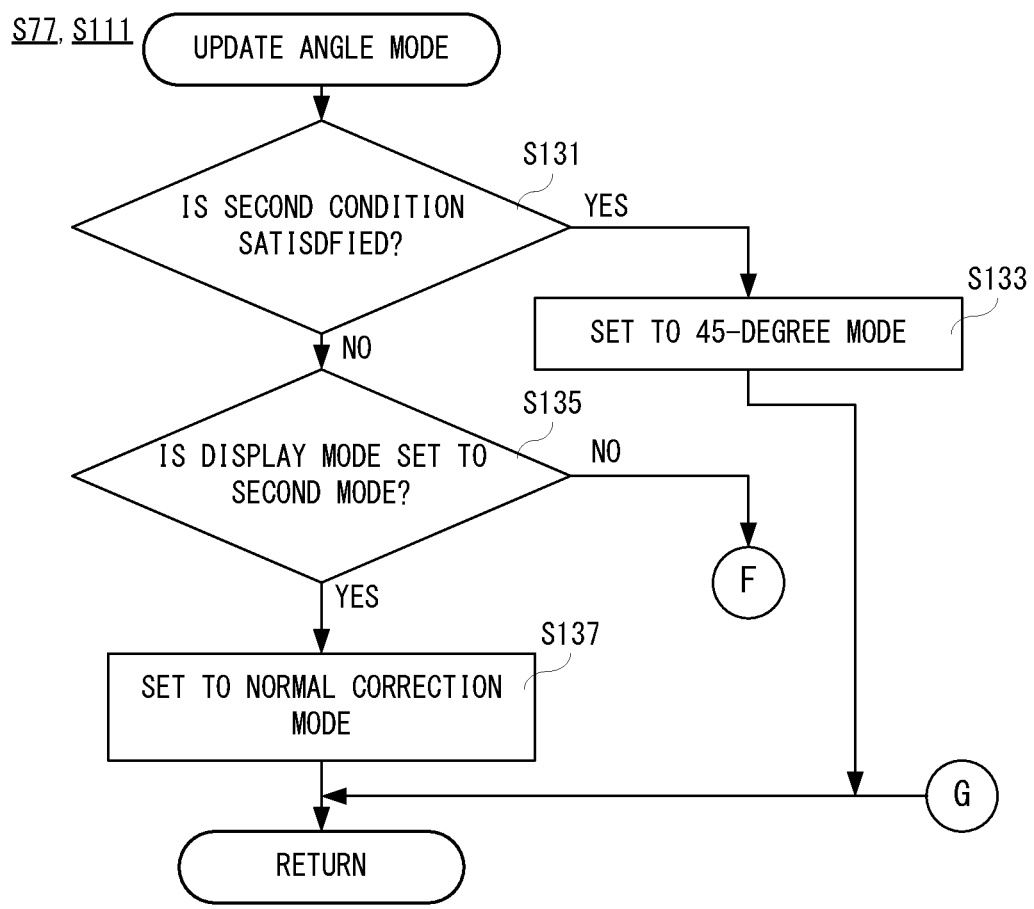
FIG. 20 is a flowchart showing another part of the angle mode update processing by the processor shown in FIG. 2, following FIG. 19.
Figure 21:
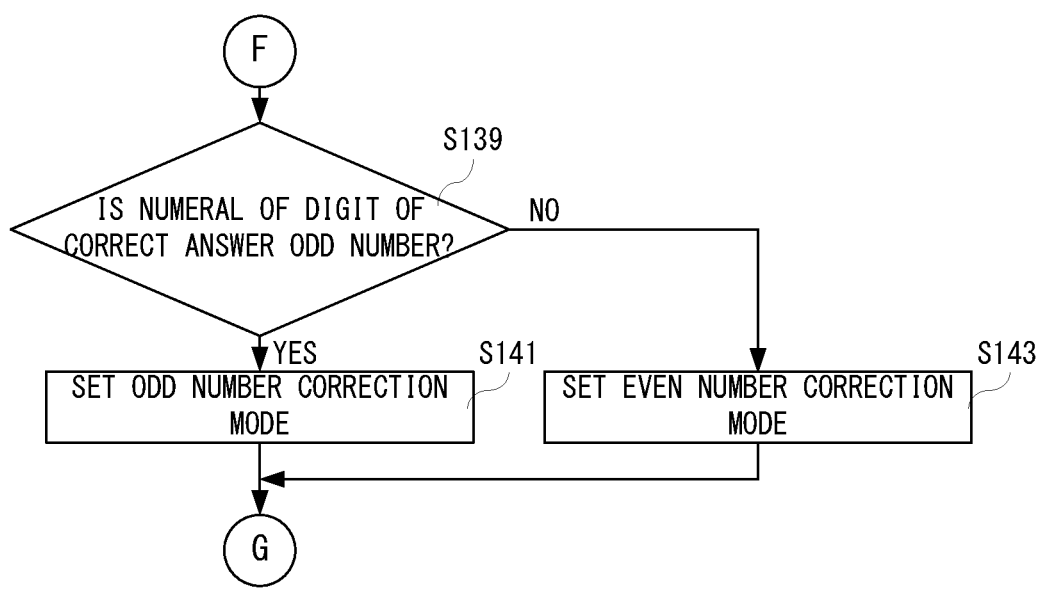
FIG. 21 is a flowchart showing non-limiting example numeral input processing by the processor shown in FIG. 2.

FIG. 20 and FIG. 21 are flowcharts of non-limiting example angle mode update processing shown in the step S77 of FIG. 18 and the step S111 of FIG. 19. As shown in FIG. 20, if the angle mode update processing is started, the processor 20 determines, in a step S131, whether the second condition is satisfied.

If "YES" is determined in the step S131, that is, if the second condition is satisfied, the angle mode is set to the 45-degree mode in a step S133, thereby to terminate the angle mode update processing to return to the 45-degree mode determination processing shown in FIG. 17 and FIG. 18, or to the numeral input processing shown in FIG. 19. In the step S133, the processor 20 sets, as the input area data 304c, data of the coordinates defining each of the plurality of input areas 200 that are set to the analog stick 58 in case of the 45-degree mode. This also applies to a case where the angle mode is to be set to the normal correction mode, the odd number correction mode or the even number correction mode, as described later.

On the other hand, if "NO" is determined in the step S131, that is, if the second condition is not satisfied, it is determined, in a step S135, whether the display mode is set as the second mode. Here, the processor 20 determines whether the display mode selection flag 304n is turned off.

If "NO" is determined in the step S135, that is, if the display mode is set to the first mode, the process proceeds to a step S139 shown in FIG. 21. On the other hand, if "YES" is determined in the step S135, that is, if the display mode is set to the second mode, the angle mode is set to the normal correction mode in a step S137, thereby to terminate the angle mode update processing to return to the 45-degree mode determination processing or the numeral input processing.

As shown in FIG. 21, in the step S139, it is determined, with reference to the correct answer data 304k, whether the numeral of the correct answer at the digit that should be currently input is the odd number. If "YES" is determined in the step S139, that is, if the numeral of the correct answer at the digit that should be currently input is the odd number, the angle mode is set to the odd number correction mode in a step S141, thereby terminating the angle mode update processing to return to the 45-degree mode determination processing or the numeral input processing. On the other hand, if "NO" is determined in the step S139, that is, if the numeral of the correct answer at the digit that should be currently input is the even number, the angle mode is set to the even number correction mode in a step S143, thereby terminating the angle mode update processing to return to the 45-degree mode determination processing or the numeral input processing.

According to this embodiment, since the numeral in the input enable state and the input numeral are not displayed in an identifiable manner on the input screen in the first mode not displaying the input content, it is possible to make it hard for the input content to be grasped from the screen.

Moreover, according to this embodiment, since the input area corresponding to the correct numeral is enlarged in the first mode not displaying the input content, it is possible to make it easy for the numeral of the correct answer to be input even when the input content is not shown. That is, it is possible to prevent an erroneous input.

Furthermore, according to this embodiment, since the input area corresponding to the correct answer numeral is enlarged and at least one input area corresponding to the numeral of the incorrect answer is reduced in the first mode not displaying the input content, it is possible to make it hard for the numeral of the incorrect answer to be input. That is, it is possible to prevent an erroneous input.

Furthermore, according to this embodiment, since the sizes of respective input areas are made the same when the analog stick is rotated, it is hard for the third party to know the correct answer even operating the analog stick.

In addition, although this embodiment is described for a case where the Pin is input, it does not need to be limited to this. When the correct answer or the content to be input is decided in advance, as described above, it is possible to set a plurality of input areas corresponding to the analog stick dependent on the angle mode according to the correct answer at the content to be input. However, when not inputting a numeral, the odd number correction mode may be a mode that the input areas in the up and down and left and right directions are enlarged, and the even number correction mode may be a mode that the input areas in the diagonal direction are enlarged. As a further example, it is thinkable to apply the embodiment to a quiz game that selects a correct answer from a plurality of selection choices. Also in the quiz game, when playing by two or more persons, the first mode that does not show the input content is set and at least the input area to which the selection choice of the correct answer is assigned is made large. Moreover, in a case where the input areas to which the selection choices of the correct answer is assigned is in the vertical direction or the horizontal direction as similar to the above-described embodiment, a mode enlarging the input areas in the vertical direction or the horizontal direction is set, and in a case where the input areas to which the selection choices of the correct answer is assigned is in the diagonal direction, a mode enlarging the input areas in the diagonal direction be large is set.

Moreover, although it is classified into two types of the odd number and the even number and the sizes of the input areas are changed dependent on such types in this embodiment, it does not need to be limited to this. According circumstances, it may be classified into three types, and in such a case, when the numerals to be input are assigned to the input areas in the vertical direction, all input areas in the vertical direction are enlarged, when the numerals to be input are assigned to the input areas in the horizontal direction, all input areas in the horizontal direction are enlarged, and when the numerals to be input are assigned to the input areas in the diagonal direction, all input areas in the diagonal direction are enlarged.

Furthermore, although this embodiment is described for a case where a numeral is to be input, a letter or character other than a numeral may be made to be input. In such a case, two or more direction input portions may be provided, whereby the processing of the steps S3 and S7-S15 in the Pin input processing shown in FIG. 14 can be performed for each direction input portion.

Furthermore, although this embodiment is described about a case where an analog stick is used as an example of the direction input portion, it does not need to be limited to this. It is possible to use a joystick or a cross button instead of the analog stick.

Moreover, the structure of the game system shown in this embodiment is an example, and does not need to be limited to this, and therefore, it is possible to adopt further structure. For example, it is possible to apply the embodiment to a portable game apparatus. Moreover, it is possible to apply the embodiment to a desktop computer connected with a monitor, a notebook type computer, a tablet type computer or a smartphone.

Furthermore, specific numerical values and screens shown in the embodiments are examples, and they can be arbitrarily changed according to actual products.

Although certain example systems, methods, storage media, devices and apparatuses have been described herein, it is to be understood that the appended claims are not to be limited to the systems, methods, storage media, devices and apparatuses disclosed, but on the contrary, are intended to cover various modifications and equivalent arrangements included within the spirit and scope of the appended claims.

What is claimed is:

1. An information processing apparatus, comprising:
   an analog stick configured to designate, by tilting, input areas respectively corresponding to a plurality of input targets; and
   one or more processors configured to:
      determine one input area designated by the analog stick among the plurality of input areas; and
      determine an input target corresponding to the identified input area, wherein the one or more processors is further configured to:
      select either a first mode in which the input target corresponding to the identified input area is not displayed in an identifiable manner or a second mode in which the input target corresponding to the ideni-fied input area is displayed in an identifiable manner, and
      in the first mode, enlarge an input area corresponding to an input target to be currently input.

2. The information processing apparatus according to claim 1, wherein the one or more processors is configured to, in the first mode, reduce at least one of the input areas corresponding to a further input target that is not to be currently input.

3. The information processing apparatus according to claim 1, wherein the one or more processors is configured to, in the first mode, enlarge one or more input areas corresponding to input targets including the input target to be currently input.

4. The information processing apparatus according to claim 3, wherein the one or more enlarged input areas include a first input area corresponding to the input target to be currently input and a second input area not adjacent to the first input area.

5. The information processing apparatus according to claim 4, wherein the one or more processors is configured to reduce an input area adjacent to the first input area.

6. The information processing apparatus according to claim 4, wherein the one or more processors is configured to reduce input areas adjacent to both the first input area and the second input area.

7. The information processing apparatus according to claim 1, wherein the input areas are disposed in a ring-like arrangement.

8. The information processing apparatus according to claim 7, wherein the analog stick is configured for tilting in a vertical direction, a horizontal direction and a diagonal direction, and
   the input areas are selectable by the tilting in the vertical direction, the horizontal direction and the diagonal direction.

9. The information processing apparatus according to claim 8, wherein the one or more processors is configured to, in the first mode, enlarge, when a first input area corresponding to the input target to be currently input is set in the vertical direction, all input areas set in the vertical direction; enlarge, when the first input area is set in the horizontal direction, all input areas set in the horizontal direction; and enlarge, when the first input area is set in the diagonal direction, input areas set in the diagonal direction.

10. The information processing apparatus according to claim 8, wherein the one or more processors is configured to, in the first mode, enlarge, when a first input area corresponding to the input target to be currently input is set in the vertical direction or the horizontal direction, all input areas that are set in the vertical direction and the horizontal direction; and enlarge, when the first input area is set in the diagonal direction, all input areas set in the diagonal direction.

11. The information processing apparatus according to claim 8, wherein input areas set in the diagonal direction are initially larger than the input areas set in the vertical direction and the horizontal direction, respectively.

12. The information processing apparatus according to claim 1, wherein the one or more processors is configured to:
determine, when an input area designated by the analog stick is changed to a further input area, whether the further input area after the change is designated for more than a defined time period; and
change the input area that is determined to be designated to the further input area when the further input area after the change is determined to be designated for more than the defined time period.

13. The information processing apparatus according to claim 12, wherein the one or more processors is further configured to:
detect a number of times that the input area designated by the analog stick is changed to a further input area; and
determine whether the detected number of times is equal to or more than a defined number of times,
wherein the one or more processors is configured to immediately change, irrespective of whether the further input area is designated for more than the defined period of time, the designated input area to the further input area when the detected number of times is equal to or more than the defined number of times.

14. The information processing apparatus according to claim 13, wherein the one or more processors is configured to equalize sizes of the input areas when the number of times is determined to be equal to or more than the defined number.

15. The information processing apparatus according to claim 1, further comprising a vibrator, wherein the one or more processors is configured to control the vibrator to vibrate when an input area is designated by the analog stick.

16. The information processing apparatus according to claim 15, wherein the one or more processors is configured to control the vibrator to vibrate when the input area designated by the analog stick is changed to a further input area.

17. An information processing system, comprising:
a display configured to display a plurality of input targets;
an analog stick configured designate, by tilting, input areas respectively corresponding to the plurality of input targets; and
one or more processors configured to:
determine one input area designated by the analog stick among the plurality of input areas; and
determine an input target corresponding to the identified input area, wherein the one or more processors is further configured to:
select either a first mode in which the input target corresponding to the identified input area is not displayed on the display in an identifiable manner or a second mode in which the input target corresponding to the identified input area is displayed on the display in an identifiable manner, and
in the first mode, enlarge an input area corresponding to an input target to be currently input.

18. A non-transitory computer-readable storage medium storing an information processing program that is executable by a computer comprising an analog stick configured to designate, by tilting, input areas respectively corresponding to a plurality of input targets, wherein the information processing program, when executed, causes one or more processors of the computer to perform operations comprising:
displaying the plurality of input targets;
determining one input area designated by the analog stick among the plurality of input areas; and
determining an input target corresponding to the identified input area, wherein
the operations further comprise:
selecting either a first mode in which the input target corresponding to the identified input area is not displayed in an identifiable manner or a second mode in which the input target corresponding to the identified input area is displayed in an identifiable manner, and
in the first mode, enlarging an input area corresponding to an input target to be currently input.

19. An information processing method for a computer comprising an analog stick configured to designate, by tilting, input areas respectively corresponding to a plurality of input targets, the method comprising:
displaying the plurality of input targets;
determining one input area designated by the analog stick among the plurality of input areas; and
determining an input target corresponding to the identified, wherein the method further comprises:
selecting either a first mode in which the input target corresponding to the identified input area is not displayed in an identifiable manner or a second mode in which the input target corresponding to the identified input area is displayed in an identifiable manner, and
in the first mode, enlarging an input area corresponding to an input target to be currently input.

* * * * *